(12) United States Patent
Bran

(10) Patent No.: US 11,973,610 B2
(45) Date of Patent: Apr. 30, 2024

(54) ALLOCATING A PHYSICAL RESOURCE TO A PARTICIPANT FOR USE IN CONNECTION WITH A VIRTUAL BREAKOUT ROOM

(71) Applicant: Zoom Video Communications, Inc., San Jose, CA (US)

(72) Inventor: Cary Arnold Bran, Vashon, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/711,595

(22) Filed: Apr. 1, 2022

(65) Prior Publication Data

US 2023/0318862 A1 Oct. 5, 2023

(51) Int. Cl.
*H04L 12/18* (2006.01)
*G06V 40/10* (2022.01)
*H04N 7/15* (2006.01)

(52) U.S. Cl.
CPC ........ *H04L 12/1822* (2013.01); *G06V 40/103* (2022.01); *H04N 7/15* (2013.01)

(58) Field of Classification Search
CPC ..... H04L 12/1822; G06V 40/103; H04N 7/15
USPC ....................................................... 709/204
See application file for complete search history.

(56) References Cited

U.S. PATENT DOCUMENTS

| | | | |
|---|---|---|---|
| 9,065,973 B2 | 6/2015 | Graham et al. | |
| 9,525,711 B2 | 12/2016 | Ackerman et al. | |
| 9,961,119 B2 | 5/2018 | Bader-Natal et al. | |
| 10,284,695 B1* | 5/2019 | Gejji | G06F 1/1632 |
| 10,937,543 B1* | 3/2021 | Newton | G06Q 10/04 |
| 11,128,636 B1* | 9/2021 | Jorasch | G06V 20/10 |
| 11,412,278 B1* | 8/2022 | Robinson | H04N 21/64784 |
| 11,621,958 B2* | 4/2023 | Chang | H04L 12/1822 |
| | | | 713/186 |
| 2013/0332208 A1* | 12/2013 | Mehta | G06Q 10/02 |
| | | | 705/5 |
| 2014/0267550 A1 | 9/2014 | Nimri et al. | |
| 2016/0088259 A1 | 3/2016 | Anderson et al. | |
| 2017/0279968 A1* | 9/2017 | Fadili | H04N 7/147 |
| 2018/0082263 A1* | 3/2018 | Michels | H04L 65/403 |
| 2018/0123987 A1* | 5/2018 | Brody | H04L 12/1822 |
| 2020/0410453 A1* | 12/2020 | Nalliah | G06F 16/93 |
| 2021/0019709 A1* | 1/2021 | Ghatak | G06F 16/909 |
| 2021/0117927 A1* | 4/2021 | Gallagher | G01W 1/10 |

(Continued)

FOREIGN PATENT DOCUMENTS

WO 2014/014147 A1 1/2014

*Primary Examiner* — Tauqir Hussain
(74) *Attorney, Agent, or Firm* — Young Basile Hanlon & MacFarlane, P.C.

(57) ABSTRACT

Multiple participants of a video conference may be detected in the same physical space. A first participant of the multiple participants may be assigned to a virtual breakout room that is associated with the video conference. An availability of a physical resource for the first participant to use in connection with the virtual breakout room may be determined. The physical resource may be allocated to the first participant for use in connection with the virtual breakout room based on the availability. For example, a group of participants may be detected in the same physical space, individually assigned to virtual breakout rooms, and/or individually allocated a physical resource for use in connection with the virtual breakout rooms.

20 Claims, 14 Drawing Sheets

(56) References Cited

U.S. PATENT DOCUMENTS

| | | | | |
|---|---|---|---|---|
| 2021/0194872 A1* | 6/2021 | Chang | ................ | H04L 12/1895 |
| 2021/0224754 A1* | 7/2021 | Zarakas | .................. | G06N 3/08 |
| 2021/0399911 A1* | 12/2021 | Jorasch | .............. | H04L 12/1822 |
| 2021/0400142 A1* | 12/2021 | Jorasch | ................ | H04L 65/403 |
| 2021/0406840 A1* | 12/2021 | DeLuca | ........... | G06Q 10/06314 |
| 2022/0108276 A1* | 4/2022 | Stringham | .......... | G06F 3/04817 |
| 2022/0270050 A1* | 8/2022 | Stringham | .......... | G06F 3/04817 |
| 2022/0417049 A1* | 12/2022 | Decrop | ................ | G06T 19/006 |

\* cited by examiner

ALLOCATING A PHYSICAL RESOURCE TO A PARTICIPANT FOR USE IN CONNECTION WITH A VIRTUAL BREAKOUT ROOM

FIELD

This disclosure relates generally to communication management and, more specifically, to allocating a physical resource to a participant for use in connection with a virtual breakout room.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
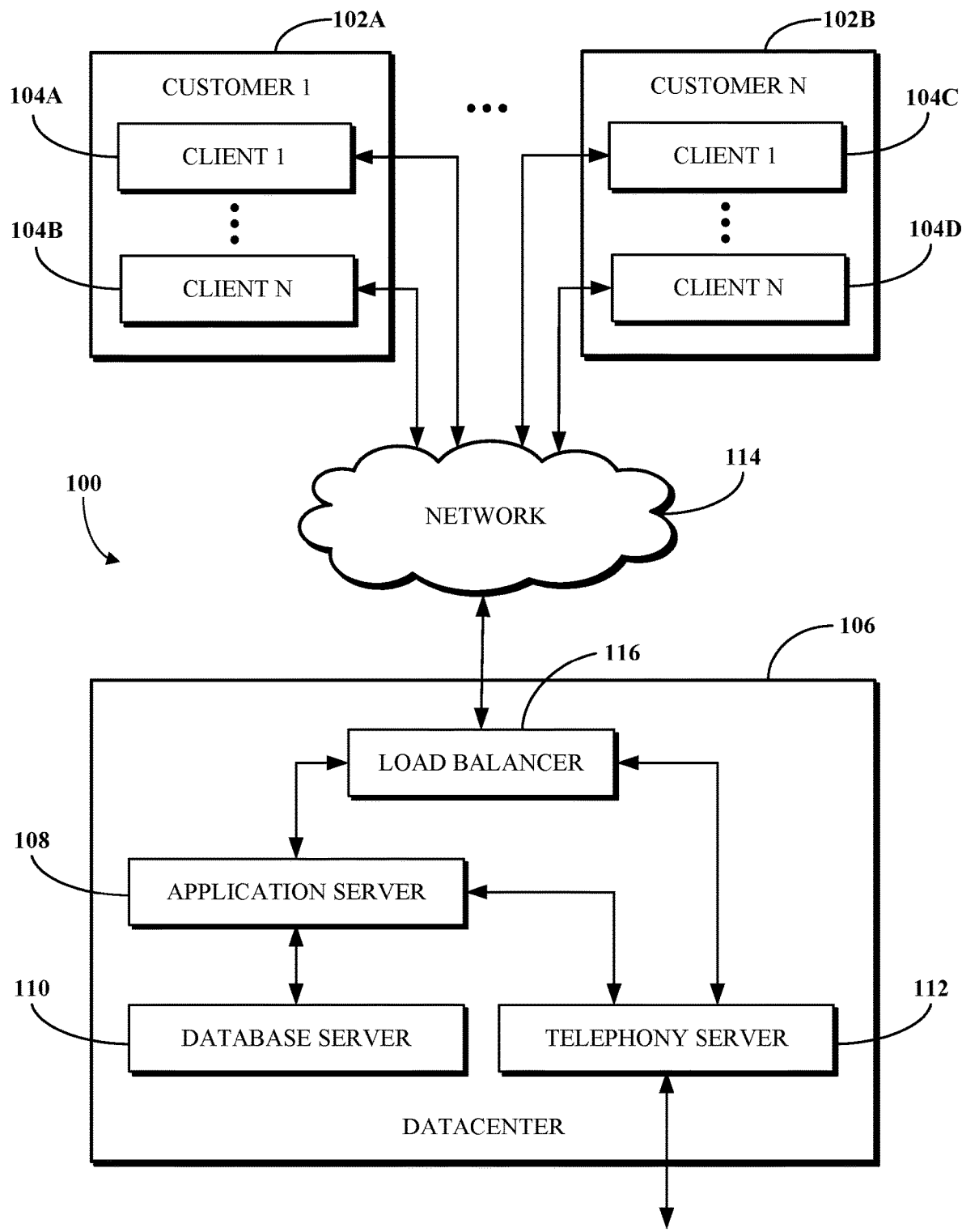
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a software platform such as a unified communications as a service (UCaaS) platform, which includes several communications services integrated over a network, such as the Internet, to deliver a complete communication experience regardless of physical location.

A UCaaS platform may in particular permit video conferencing between participants at remote locations. During a video conference, at least some of the participants may join one or more virtual breakout rooms. A "virtual breakout room" is a virtual conference that allows some number of participants of a main conference to temporarily leave the main conference and join a side conference (e.g., breakout). Thus, virtual breakout rooms permit splitting participants of a main conference into smaller conferences. While virtual breakout rooms may work efficiently for individual remote participants, they may be more difficult to implement for a group of in-person participants attending the conference collectively (e.g., a video conference comprising in-person and remote participants in a "hybrid" model). As used herein, in-person participants may refer to a collection or group of two or more participants of a video conference that are in a same physical space, and remote participants may refer to individual participants of a video conference that are alone in a physical space. For example, conferencing software implemented by a video conferencing system may show the meeting space where multiple participants have joined from as a single participant (resource) in the conference. This may be problematic as the video conferencing system may be without contextual awareness that more than one participant is joining from the meeting space. Additionally, while some video conferencing systems can detect or even count people in a meeting space, the conferencing software may have difficulty connecting the individual meeting space participants to virtual breakout rooms. For example, connecting a participant in a meeting space to a virtual breakout room could involve a participant leaving a physical space, finding another space and an electronic device, and using the space and the electronic device to access their assigned virtual breakout room via the conferencing software. However, this may be cumbersome and disruptive to the conference process. Furthermore, where there is a limited availability of spaces and/or devices, it may be infeasible for this to work at all.

Implementations of this disclosure address problems such as these by detecting multiple participants of a video conference in a same physical space, assigning a first participant of the multiple participants to a virtual breakout room associated with the video conference, determining an availability of a physical resource for the participant to use in connection with the virtual breakout room, and allocating the physical resource to the participant for use in connection with the virtual breakout room based on the availability. The physical resources may include computing resources (e.g., phones, smartphones, smart TVs, monitors, cameras, microphones, computers, laptops, tablets, digital whiteboards, touch screens, and the like, some of which may include conferencing software integrated therein), non-computing resources (e.g., rooms, desks, chairs, and the like), or a combination thereof. A facial recognition system may be used to detect the participants in the same physical space. A scheduling service may be used to determine the availability of the physical resources and/or to reserve the physical resources for the participants. A digital signage device may be used to notify the participants of the physical resources and/or to guide the participants to the physical resources. The participants may use the physical resources they are allocated to join the virtual breakout rooms to which they are assigned.

To describe some implementations in greater detail, reference is first made to examples of hardware and software structures used to implement a system to allocate a physical resource to a participant for use in connection with a virtual breakout room. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
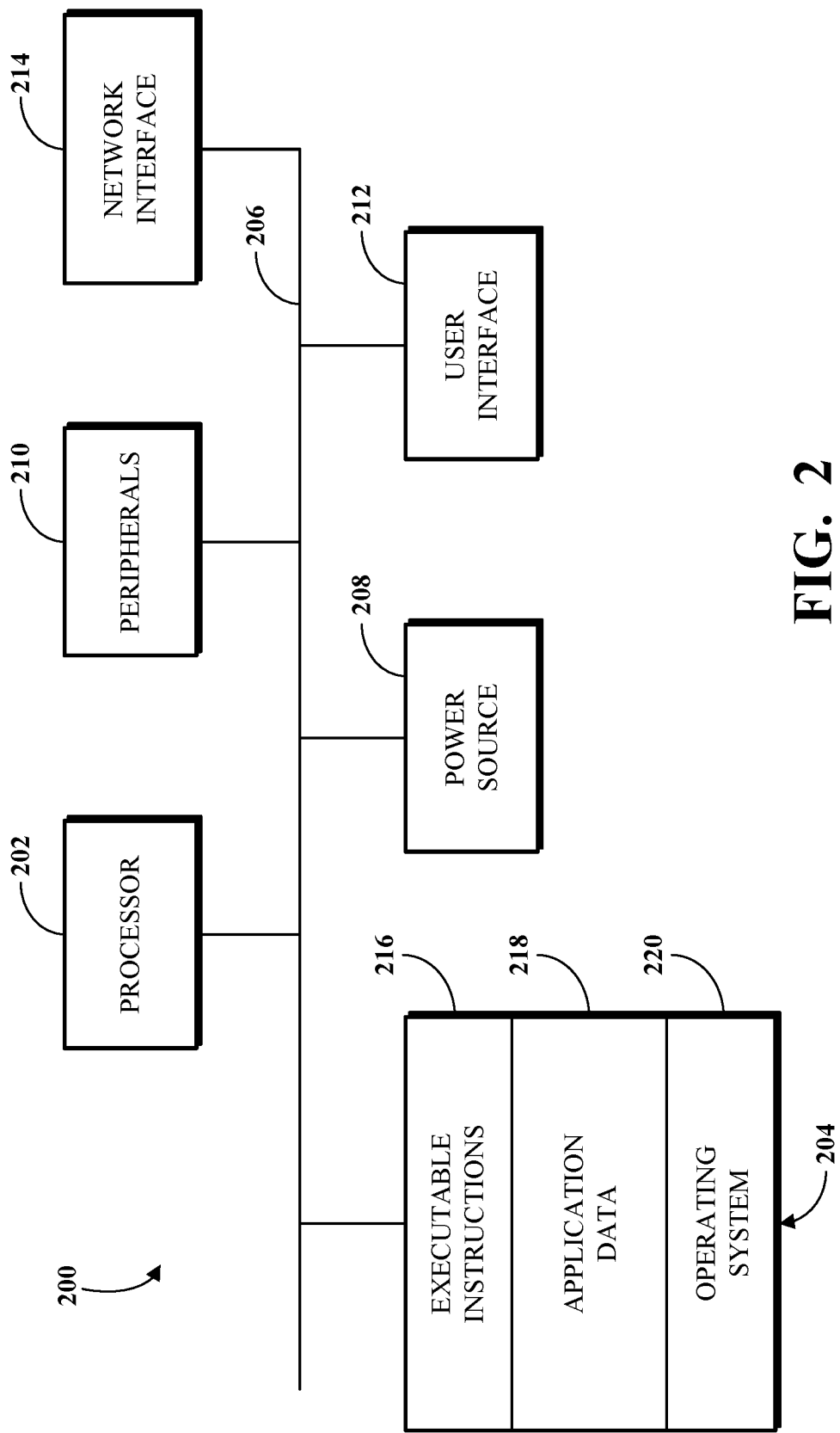
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
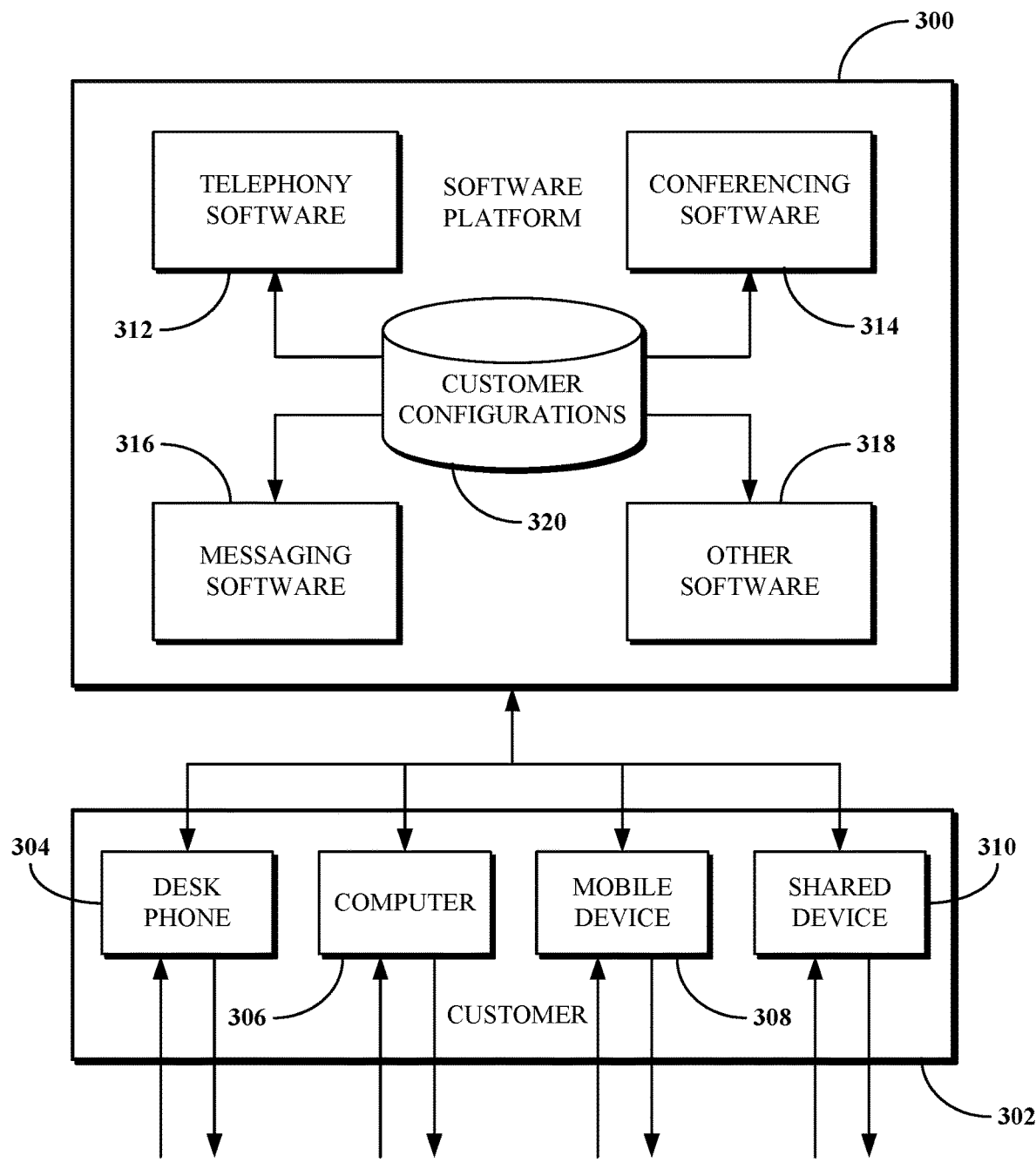
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for allocating a physical resource to a participant for use in connection with a virtual breakout room. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
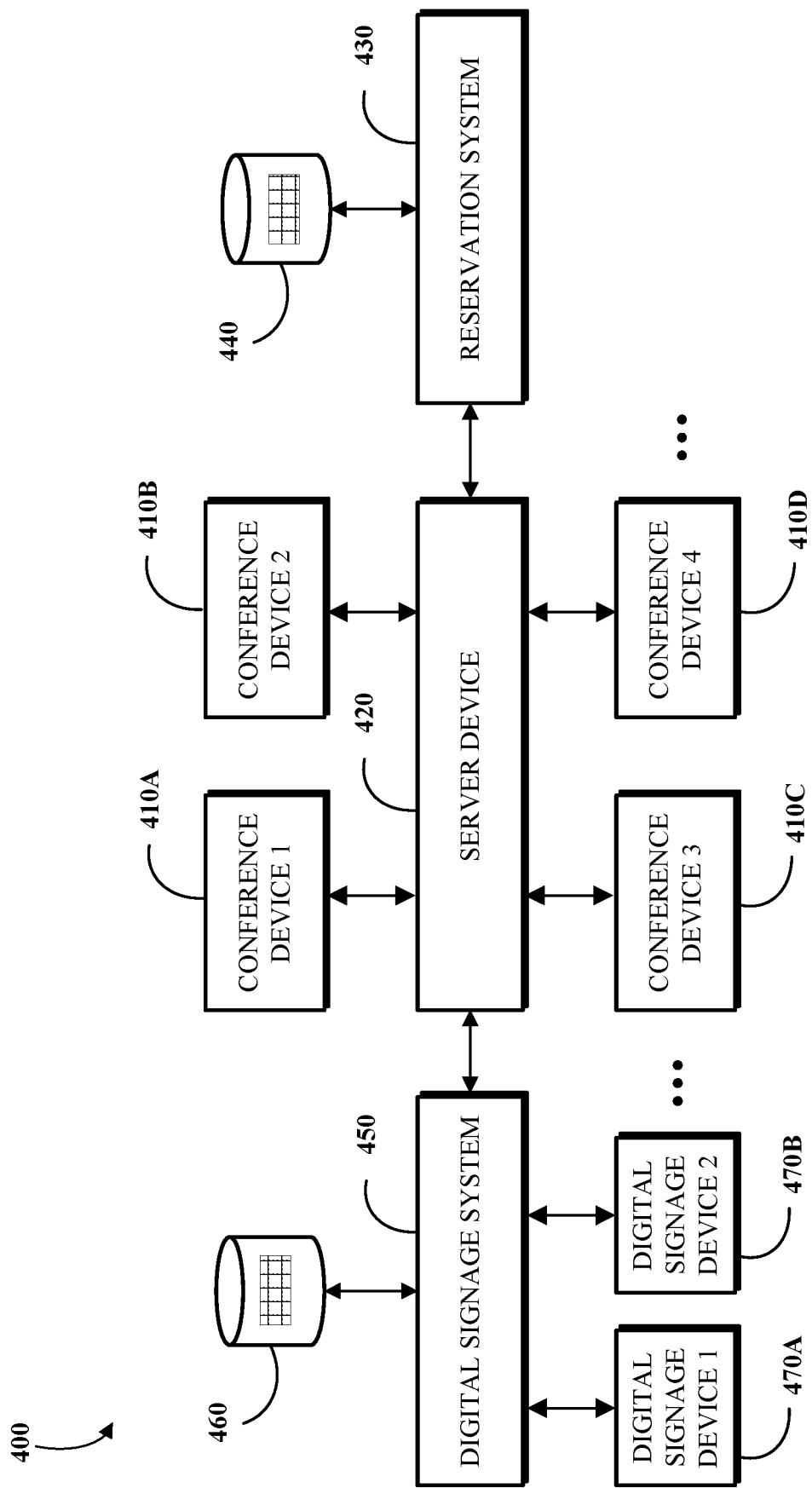
FIG. 4 is a block diagram of an example of a system for allocating physical resources to participants for use in connection with virtual breakout rooms.

FIG. 4 is a block diagram of an example of a system 400 for allocating physical resources to participants for use in connection with virtual breakout rooms. The system 400 may include one or more conference devices that can be used by participants, such as conference devices 410A through 410D. For example, a conference device could be a client device such as one of the clients 104A through 104D shown in FIG. 1 or 304 through 310 shown in FIG. 3. A conference device could be operated by a single user in a physical space (e.g., a participant at a remote location), such as an individual in a classroom, office, conference room, or other meeting space, in which case the conference device may be a single-user device. Alternatively, the conference device could be operated by multiple users in a same physical space (e.g., multiple in-person participants in a group), such as individuals together in a classroom, office, conference room, or other meeting space (e.g., a main meeting room), in which case the conference device may be a shared device. The conference devices 410A through 410D may execute software (e.g., client-side conferencing software, which could, for example, be via a client application or a web application) to connect to a server device 420. The server device 420 may execute software (e.g., server-side conferencing software) to support a video conference between participants using the conference devices 410A through 410D. For example, the server device 420 could be a server at the datacenter 106 shown in FIG. 1.

During a video conference, it may be desirable for participants associated with the conference devices 410A through 410D to join virtual breakout rooms. The virtual breakout rooms may permit splitting the participants of the video conference (e.g., the main conference) into smaller side conferences. To reduce disruption to the conference process, and/or to ensure availability of spaces and/or devices for the participants, the conferencing software (e.g., the server-side conferencing software) may execute to detect that multiple participants of a video conference are in the same physical space. In some implementations, to detect that multiple participants are in the same physical space, the conferencing software may implement or use a facial recognition system to detect the individual participants among multiple participants present in a video stream captured using one of the conference devices 410A through 410D. For example, the conferencing software may use Zoom Rooms Smart Gallery, available from Zoom Video Communications, Inc., to detect the individual participants among multiple participants present in a video stream captured within the physical space in which the multiple participants are located. The conferencing software may then assign the participants, individually, to virtual breakout rooms, such as by assigning participants that are together in the same physical space to different virtual breakout rooms.

By way of example, participants associated with the conference devices 410A through 410D may be in a video conference. For example, participants A through C, using the conference device 410A, may be in the video conference, and participant D, using the conference device 410B, may also be in the video conference. During the video conference, it may be desirable to divide the participants into virtual breakout rooms in various ways. For example, at one time during the conference, it may be desirable to assign participants B and D to a first virtual breakout room and to assign participant C to a second virtual breakout room. The conferencing software may detect the participants via video streams associated with the conference devices, such as individually detecting participants A through C in a video stream associated with the conference device 410A and detecting participant D in a video stream associated with the conference device 410B. The conferencing software may then assign the individual detected participants to the virtual breakout rooms, including assigning participants that are together in a same physical space to different virtual breakout rooms. For example, the conferencing software may assign participants B and D to the first virtual breakout room and participant C to the second virtual breakout room.

The server device 420 may communicate with a reservation system 430 (e.g., a workspace reservations system and/or scheduling service) to determine the availability of physical resources and to reserve the physical resources for individual participants to use for their respective virtual breakout rooms based on their availability. For example, the reservation system 430 could be implemented by a server at the datacenter 106 shown in FIG. 1 and/or by the server device 420. The reservation system 430 could execute reservation software (e.g., which may respond to calls from the server device 420) to determine the availability of physical resources which may be specified in a physical resource data structure 440. For example, the physical resource data structure 440 could be a data store that is accessible to the reservation system 430. The physical resources may include computing resources, non-computing resources, or a combination thereof. In the physical resource data structure 440, the physical resources may be associated with physical locations (e.g., via a map or lookup table), such as by room name, room number, physical address, or coordinates. For example, the physical resource data structure 440 may indicate that physical resource 1 is located in meeting room A on a first floor of a premises, physical resource 2 is located in meeting room B on the first floor of the premises, physical resource 3 is located in meeting room C on the first floor of the premises, and so forth. In various implementations, the physical resources may be located on different floors and/or in different buildings at different locations and may include, for example, huddle spaces, conference rooms, cubicles, office spaces and even common areas (such as a cafeteria). The physical resource data structure 440 may also include information about the functionality available at each physical resource (e.g., the number of participants that a physical resource can accommodate, the availability of cameras, speakers, microphones and/or displays, the seating capacity, the level of privacy corresponding to the physical resource and/or the amount of time needed to travel from one physical resource to another).

The reservation system 430 may implement a calendaring system to reserve physical resources in the physical resource data structure 440. The calendaring system may be used to indicate the availability and/or the unavailability of physical resources in the physical resource data structure 440, such as by date and/or time. For example, the reservation system 430 may use the calendaring system to determine that physical resources 1 through 3 are available during a date and a time of a scheduled video conference, and to determine that the physical resources 4 through 6 are unavailable during the date and the time of the scheduled video conference. Based on the determined availability and/or location of the physical resources, the server device 420 may further communicate with the reservation system 430 to reserve the physical resources. For example, the server device 420 may communicate with the reservation system 430 to reserve the physical resources 1 to 3, based on their determined availability during the date and the time of the scheduled video conference. The reservation system 430 may then make the physical resources 1 to 3 unavailable for other events during the date and the time of the scheduled video conference. The server device 420 may allocate the physical resources that have been reserved (e.g., those determined to be available by the reservation system 430) to participants of the video conference to use in connection with the virtual breakout rooms. While a physical resource may be allocated to a single participant, in some implementations, a physical resource may be allocated to multiple participants (e.g., a shared physical resource).

In some implementations, the assignment of participants to virtual breakout rooms, and/or the allocation of physical resources to participants, may occur while a video conference is already in progress. For example, participants may be assigned to virtual breakout rooms, and/or the physical resources may be allocated to the participants, based on the participants determined to be in attendance during the video conference (e.g., in an ad hoc manner). In some implementations, the assignment of participants to virtual breakout rooms, and/or the allocation of physical resources to participants, may occur before a video conference starts. For example, the conferencing software may use a machine learning model to predict the participants of a video conference (e.g., whether participants are likely to attend, whether participants are likely to attend in person or remotely), to determine assignments of participants to virtual breakout rooms based on the prediction, and/or to allocate the physical resources to the participants based on the prediction.

In some implementations, the conferencing software may reference a higher level data set to determine assignments of participants to virtual breakout rooms and/or to determine allocations of physical resources to participants. For example, the conferencing software may reference one or more files, such as a real-time transcription of the video conference, project-related data (e.g., organizational charts, rosters, presentations, product information), past messages (e.g., transcribed voice mails, instant messages, text messages, chats), or other historical data (e.g., a transcription of a past video conference) to process contextual information to determine assignments of participants to virtual breakout rooms. The conferencing software may use text recognition software to analyze the files to determine the physical resources. The conferencing software may use the files to determine the assignments of participants to virtual breakout rooms, to determine the allocation of physical resources, and/or to configure the physical resources. The conferencing software may determine the assignments of participants to virtual breakout rooms, determine the allocation of physical resources, and/or configure the physical resources based on common interests of participants, locations of participants, work functions, study functions, interests of participants, and/or relationships of participants in an organization. For example, the conferencing software may determine that phones may be sufficient for allocating to participants of a first virtual breakout room, which may be limited to discussing a topic, while a digital whiteboard may be allocated to participants of a second virtual breakout room, which may be tasked with producing a graphic illustration.

Additionally, the assignment of participants to virtual breakout rooms, and/or the allocation of physical resources to participants, may be adjusted one or more times during a video conference, such as by adjusting the assignment of participants to virtual breakout rooms and/or adjusting the allocation of physical resources based on changes in attendance by participants (e.g., participants joining and leaving the video conference). In some implementations, the assignment of participants to virtual breakout rooms, and/or the allocation of physical resources to participants, may be automatically generated and/or adjusted by the conferencing software without user intervention (e.g., programmatically). In this way, a meeting host or moderator may, for example, rely on the conferencing software without requiring the host's own knowledge of the physical resources. In some implementations, the assignment of participants to virtual breakout rooms, and/or the allocation of physical resources to participants, may be manually generated and/or adjusted by one or more participants of the video conference, such as a meeting host or moderator. In this way, a meeting host or moderator may, for example, take advantage of their own knowledge of the physical resources that may be available.

The server device 420 may communicate with a digital signage system 450 (e.g., a digital signage service) to cause a display of locations of physical resources, such as for directing participants to the physical resources that have been allocated. For example, the digital signage system 450 could be implemented by a server at the datacenter 106 shown in FIG. 1 and/or by the server device 420. The digital signage system 450 could execute digital signage software (e.g., which may respond to calls from the server device 420) to determine the location and/or availability of digital signage devices (e.g., smart TVs, screens, monitors, and the like, which may include computers for communicating in the system 400), such as digital signage devices 470A and 470B. For example, the location and/or availability of the digital signage devices 470A and 470B may be specified in a digital signage data structure 460. The digital signage data structure 460 could be a data store that is accessible to the digital signage system 450. The digital signage system 450 may receive the allocations of physical resources from the server device 420. The digital signage system 450 may also receive and/or determine the locations and/or directions associated with the physical resources. For example, the locations and/or directions may also be specified in the digital signage data structure 460. The digital signage system 450 may push updates to the digital signage devices (e.g., the digital signage devices 470A and 470B), based on their availability, that cause the digital signage devices to display the allocations, locations, and/or directions. For example, the digital signage data structure 460 may indicate that the digital signage devices 470A and 470B are available during a date and a time of a scheduled video conference. The digital signage system 450 may receive the allocations of the physical resources 1 to 3, associated with the scheduled video conference, from the server device 420. The digital signage system 450 may also receive and/or determine the locations and/or directions associated with the physical resources 1 to 3. Based on the location and/or availability of the digital signage devices 470A and 470B, the digital signage system 450 may push updates to the digital signage devices 470A and 470B during the video conference. The updates may cause the digital signage devices 470A and 470B to display the allocations, locations, and/or directions associated with the physical resources 1 to 3 during the scheduled video conference. This may permit notifying the participants of the physical resources and/or guiding the participants to the physical resources.

In some implementations, images associated with the participants of a video conference (e.g., faces of the participants) may be captured and framed by the conferencing software. For example, the images may be captured by the facial recognition system used to detect the individual participants among multiple participants present in a video stream (e.g., in a same physical space). In some implementations, the images of the participants may be used by the digital signage system 450, such as to display pictures of participants to which physical resources have been allocated, to display pictures of participants in connection with locations of their allocated physical resources, and/or to display pictures of participants in connection with directions to their allocated physical resources.

In some implementations, the images of the participants may be used by the facial recognition system to determine the identities of the participants. In such implementations, the names or other identifiers of identified participants may be used to configure the physical resources for the identified participants (e.g., to personalize the physical resource and/or the allocation of the physical resource with the name of the person). For example, when the physical resources comprise computing resources, the identity may be used to push configurations to the computing resource for use by the identified participants, such as by updating a display of the computing resource with a participant's name, and/or by installing software that may be used by the participant. Also, when the physical resources comprise computing resources, the identity may be used to authenticate the participant using the computing resource to permit connecting the computing resource to the virtual breakout room with security. Further, in some implementations, the names or other identifiers of the participants may be used by the digital signage system 450, such as to display names of identified participants in connection with allocations, locations, and/or directions associated with the physical resources.

Figure 5:
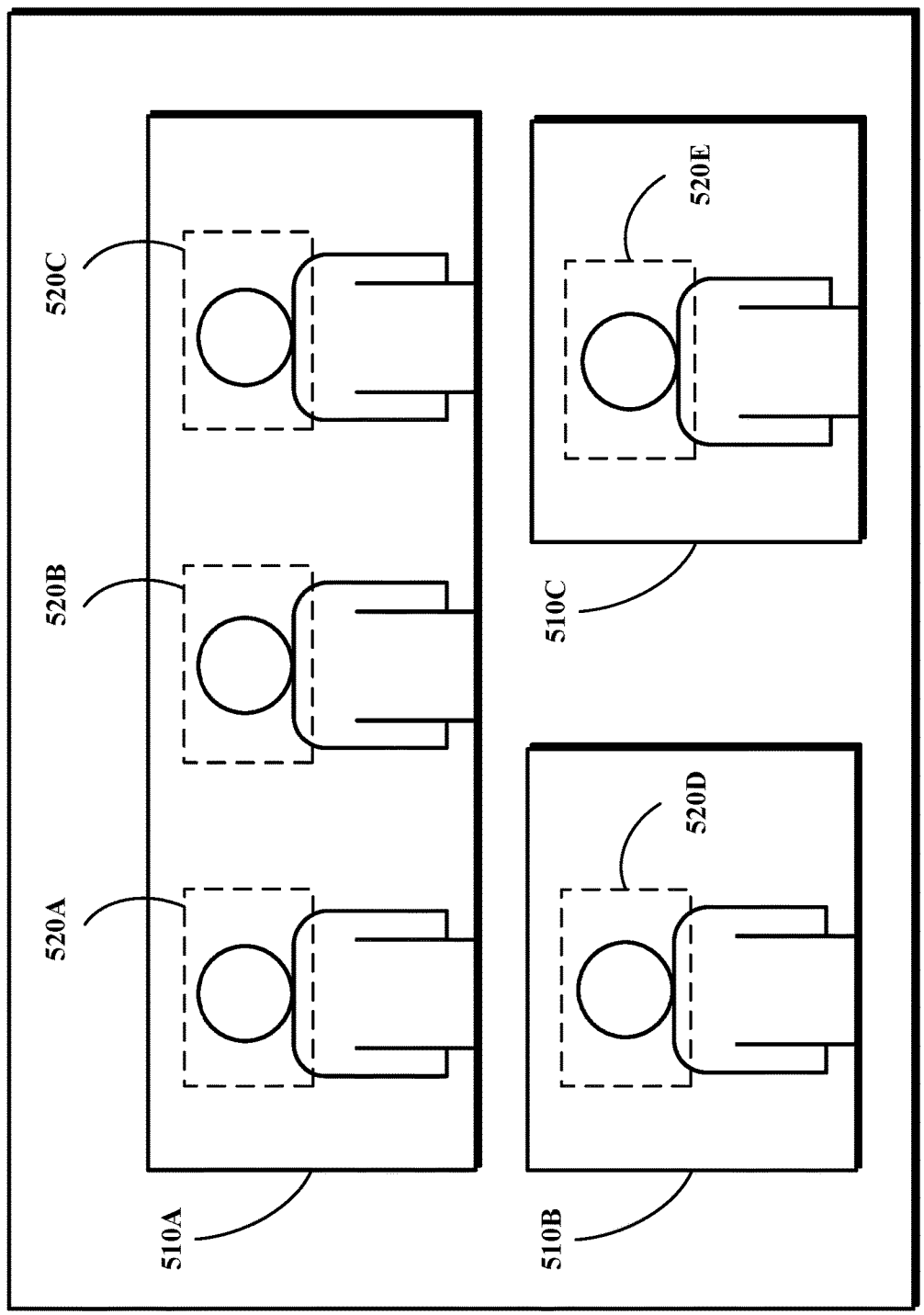
FIG. 5 is an illustration of an example of a graphical user interface associated with participants of a video conference in which some participants are in the same physical space.

FIG. 5 is an illustration of an example of a graphical user interface 500 associated with participants of a video conference in which some participants are in a same physical space. A first conference device, like the conference device 410A shown in FIG. 4, may be used to generate a first video stream 510A associated with the video conference. The first conference device may be operated by multiple users in a same physical space (e.g., multiple in-person participants in a group), such as participants 520A through 520C. For example, the participants 520A through 520C may be individuals that are together in a classroom, office, conference room, or other meeting space. A second conference device, like the conference device 410B shown in FIG. 4, may be used to generate a second video stream 510B associated with the same video conference. The second conference device may be operated by a single user in another physical space (e.g., a participant at a remote location) such as participant 520D. For example, the participant 520D may be an individual that is alone in another classroom, office, conference room, or other meeting space. A third conference device, like the conference device 410C shown in FIG. 4, may be used to generate a third video stream 510C associated with the same video conference. The third conference device may be operated by another single user in yet another physical space (e.g., another participant at a remote location) such as participant 520E. Thus, the video conference could comprise a first number ("N1") of in-person participants (e.g., the participants 520A through 520C) and a second number ("N2") of remote participants (e.g., the participants 520D and 520E) in a hybrid model. The first number ("N1") of in-person participants and the second number ("N2") of remote participants may change during the video conference, such as by participants joining and/or leaving the video conference. Additionally, during a video conference, a participant may change from in-person to remote based on one or more other participants leaving the participant alone in a physical space, and/or a participant may change from remote to in-person based on one or more other participants joining the participant in the same physical space. Further, the first number ("N1") of in-person participants may be divided among different locations, such as a first group in a first physical location (e.g., the participants 520A through 520C) and a second group in second physical location.

During the video conference, it may be desirable for the participants 520A through 520E to be separated into one or more virtual breakout rooms. The virtual breakout rooms may permit splitting the participants 520A through 520E into smaller side conferences. To reduce disruption to the conference process, and/or to ensure availability of spaces and/or devices for the participants, conferencing software (e.g., software associated with a server device like the server device 420 shown in FIG. 4) may execute to detect that multiple participants of a video conference are in a same physical space (e.g., the participants 520A through 520C in the first video stream 510A). For example, the conferencing software may implement a facial recognition system to detect the individual participants 520A, 520B, and 520C in the first video stream 510A. Responsive to detecting the individual participants 520A, 520B, and 520C, and detecting the individual participant 520D in the second video stream 510B and the individual participant 520E in the third video stream 510C, the conferencing software may assign the participants 520A through 520E to virtual breakout rooms. This may include assigning individual ones of the participants 520A through 520C (e.g., in the same physical space) to different virtual breakout rooms, such as by assigning the participant 520B to a first virtual breakout room and assigning the participant 520C to a second virtual breakout room. The conferencing software may allocate, or cause to be allocated, physical resources to one or more of the participants 520A through 520E based on assignments to the virtual breakout rooms for use in connection with the virtual breakout rooms. A physical resource that is allocated may correspond to a virtual breakout room. Additionally, the physical resources may be associated with physical locations, such as rooms and/or computing resources in rooms. The conferencing software may allocate one or more physical resources to one participant (e.g., an individual) and/or one or more physical resources to multiple participants (e.g., a group). In some configurations, multiple physical resources that are allocated may correspond to a same virtual breakout room.

In some implementations, images associated with the participants of the video conference (e.g., faces of the participants 520A through 520E) may be captured and framed by the conferencing software. For example, the images may be captured by the facial recognition system. In one example, the images may be used by a digital signage system, like the digital signage system 450 shown in FIG. 4, to notify the participants 520A through 520E of the physical resources and/or to guide the participants 520A through 520E to the physical resources via one or more digital signage device. For example, the images may be used to display pictures of the participants 520A through 520E at digital signage devices like the digital signage devices 470A and 470B shown in FIG. 4. In another example, the images may be used to determine the identities of the participants 520A through 520E. For example, the identities may be used to push configurations to computing resources, to authenticate the participants 520A through 520E at computing resources, and/or to display names of the participants 520A through 520E at the digital signage devices. In some implementations, the conferencing software may execute to assign the participants to virtual breakout rooms and/or to allocate physical resources, corresponding to the virtual breakout rooms, to the participants for use in connection with the virtual breakout rooms. In some implementations, the participants may be assigned to virtual breakout rooms so that at least two participants are present in a virtual breakout room (e.g., a participant is not alone in a virtual breakout room). For example, the conferencing software may count the participants that are available and determine the assignments and/or the allocations based on the count. In some implementations, the conferencing software may execute to notify a host or moderator of the video conference as to whether sufficient participants and/or sufficient physical resources are available.

Figure 6:
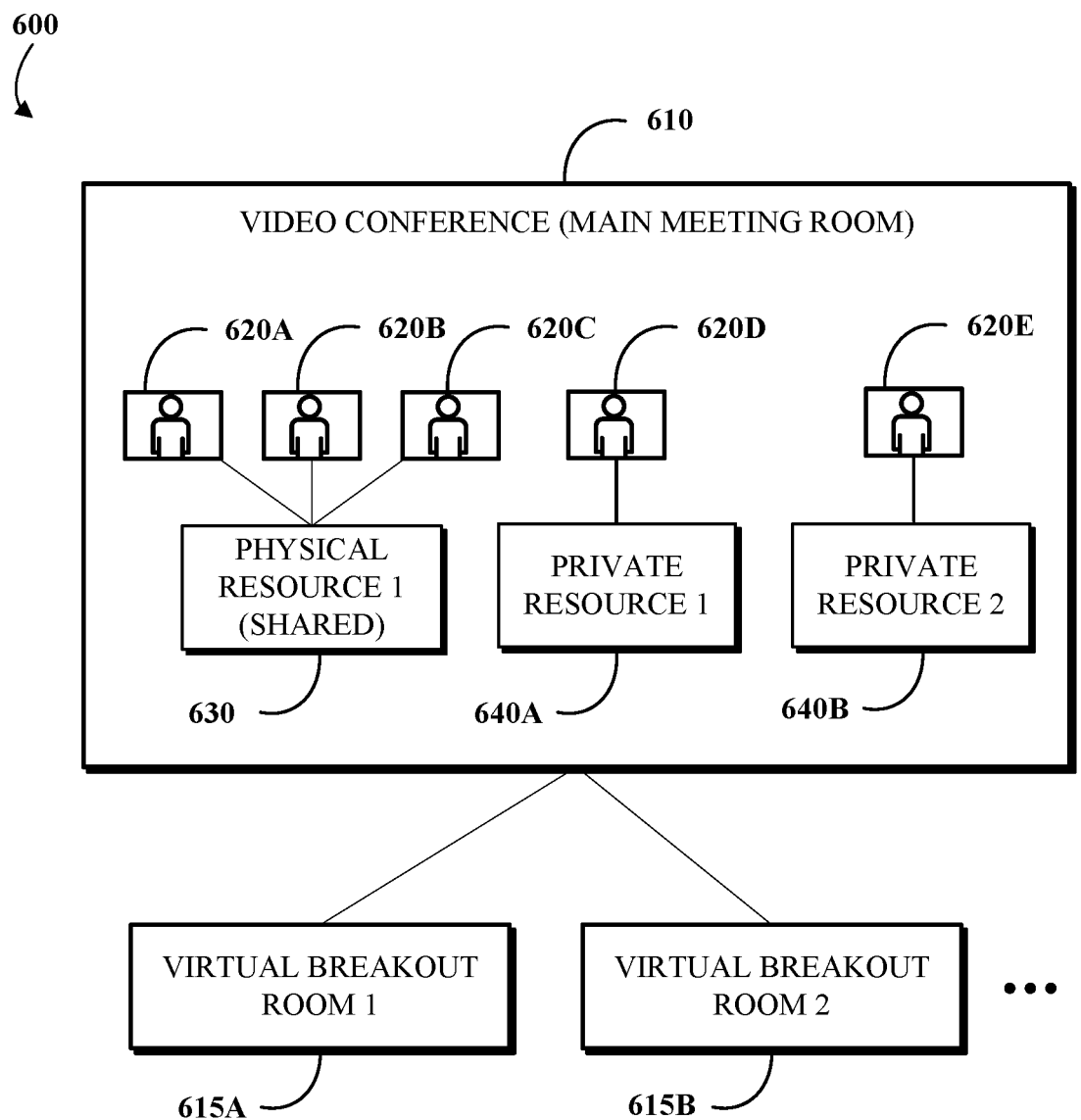
FIG. 6 is an illustration of an example of a system including a video conference with virtual breakout rooms.

FIG. 6 is an illustration of an example of a system 600 including a video conference 610 with virtual breakout rooms, such as virtual breakout rooms 615A and 615B. A first conference device, like the conference device 410A shown in FIG. 4, may be used to generate a first video stream associated with the video conference 610, like first video stream 510A shown in FIG. 5. The first conference device may be operated by multiple users in a same physical space (e.g., multiple in-person participants in a group), such as participants 620A through 620C. For example, the participants 620A through 620C may be individuals that are together in a classroom, office, conference room, or other meeting space, like the participants 520A through 520C shown in FIG. 5. The participants 620A through 620C may be using a shared physical resource 630 (e.g., "physical resource 1," being shared among the participants 620A through 620C). For example, the shared physical resource 630 could comprise a reserved classroom or conference room with desks, chairs, and a computer including conferencing software integrated therein.

A second conference device, like the conference device 410B shown in FIG. 4, may be used to generate a second video stream associated with the video conference 610, like the second video stream 510B shown in FIG. 5. The second conference device may be operated by a single user in another physical space (e.g., a participant at a remote location) such as participant 620D. For example, the participant 620D may be an individual that is alone in another classroom, office, conference room, or other meeting space, like the participant 520D shown in FIG. 5. The participant 620D may be using a first private physical resource 640A. For example, the first private physical resource 640A could comprise a personal mobile device (e.g., a smartphone, laptop, or tablet) with conferencing software integrated therein. Additionally, a third conference device, like the conference device 410C shown in FIG. 4, may be used to generate a third video stream associated with the video conference 610, like the third video stream 510C shown in FIG. 5. The third conference device may be operated by another single user in yet another physical space (e.g., another participant at a remote location) such as participant 620E. For example, the participant 620E may be another individual that is alone in a classroom, office, conference room, or other meeting space, like the participant 520E shown in FIG. 5. The participant 620E may be using a second private physical resource 640B. For example, the second private physical resource 640B could comprise a personal mobile device (e.g., a smartphone, laptop, or tablet) with conferencing software integrated therein. Thus, the video conference 610 could comprise in-person participants (e.g., the participants 620A through 620C) and remote participants (e.g., the participant 620D and the participant 620E) in a hybrid model.

During the video conference 610, it may be desirable for the participants 620A through 620E to be separated into one or more virtual breakout rooms, such as the virtual breakout rooms 615A and 615B. The virtual breakout rooms may permit splitting the participants 620A through 620E into smaller side conferences. To reduce disruption to the conference process, and/or to ensure availability of spaces and/or devices for the participants, conferencing software (e.g., software associated with a server device like the server device 420 shown in FIG. 4) may execute to detect that multiple participants of a video conference are in a same physical space (e.g., the participants 620A through 620C using the shared physical resource 630). For example, the conferencing software may implement a facial recognition system to detect the individual participants 620A, 620B, and 620C in the first video stream. Responsive to detecting the individual participants 620A, 620B, and 620C, and detecting the individual participant 620D using the first private physical resource 640A and the individual participant 620E using the second private physical resource 640B, the conferencing software may assign one or more of the participants 620A through 620E to the virtual breakout rooms 615A and 615B. This may include assigning individual ones of the participants 620A through 620C in the same physical space to different virtual breakout rooms. The conferencing software may allocate, or cause to be allocated, physical resources to one or more of the participants 620A through 620E based on assignments to the virtual breakout rooms for use in connection with the virtual breakout rooms.

In some implementations, allocating the physical resources may include keeping one or more participants with physical resources currently being used by the one or more participants. For example, allocating the physical resources could include allocating the shared physical resource 630, being used by participant 620A, among others, to participant 620A. In some implementations, allocating the physical resources may include moving one or more participants to physical resources that the one or more participants are not currently using. For example, allocating the physical resources may include moving participant 620B to a physical resource that participant 620B is not currently using (e.g., a physical resource that is different than the shared physical resource 630, such as a computing resources in another meeting space). In some implementations, allocating the physical resources may include allocating the physical resources based on locations and/or capabilities of the physical resources. For example, allocating a physical resource to participant 620B may be based on a location of the physical resource being in closer proximity to participant 620B than another physical resource (e.g., allocating a physical resource comprising a computing resource in "meeting room B" based on its proximity to participant 620B in the "main meeting room") and/or capabilities of the physical resource over another physical resource (e.g., allocating a physical resource based on its including video conferencing software, a camera, a speaker, a microphone, and/or a display). In some implementations, allocating the physical resources may include allocating the physical resources based on a travel time associated with moving from a current location to the physical resource. For example, allocating a physical resource to participant 620B may be based on a travel time for participant 620B to move to the physical resource (e.g., a travel time to "meeting room B" from a current location in the "main meeting room"). The conferencing software may calculate a travel time and compare a result of the calculation to a travel limit to determine whether to allocate a physical resource to the participant (e.g., allocate the physical resource when the travel time is less than the travel limit). In some implementations, the conferencing software may delay start of the video conference and/or delay start of one or more virtual breakout rooms based on a travel time and/or a travel limit. This may permit giving different participants equal time to travel to various physical resources so that the different participants can begin at the same time without an advantage to one participant over another. In some implementations, allocating the physical resources may include allocating the physical resources in a way that increases efficient use of the physical resources among the participants. For example, the conferencing software may determine that a physical resource comprising a smaller space may be acceptable for a one or more participants in a smaller group, while a physical resource comprising a larger space may be rejected for the smaller group in view of an availability of the smaller space. This may permit efficient use of the physical resources based on various assignments of the participants.

In some implementations, increasing efficient use of the physical resources may include prioritizing the capabilities of the physical resources over the locations of the physical resources, or prioritizing the locations of the physical resources over the capabilities of the physical resources. For example, the conferencing software may prioritize capabilities over locations when determining that a physical resource comprising a smaller space that is further away may be acceptable for a one or more participants in a smaller group while a physical resource comprising a larger space that is closer may be rejected for the smaller group in view of the availability of the smaller space. In some implementations, increasing efficient use of the physical resources may include determining the number of participants assigned to a virtual breakout room and/or determining the capabilities of the participants, such as the availability of private resources associated with the participants (e.g., mobile devices). For example, the conferencing software may determine that a physical resource comprising a smaller space without a computing resource may be acceptable for a one or more participants in a smaller group having a mobile device, while a physical resource comprising a larger space having a computing resource may be rejected for the smaller group in view of the availability of the smaller space.

Figure 7:
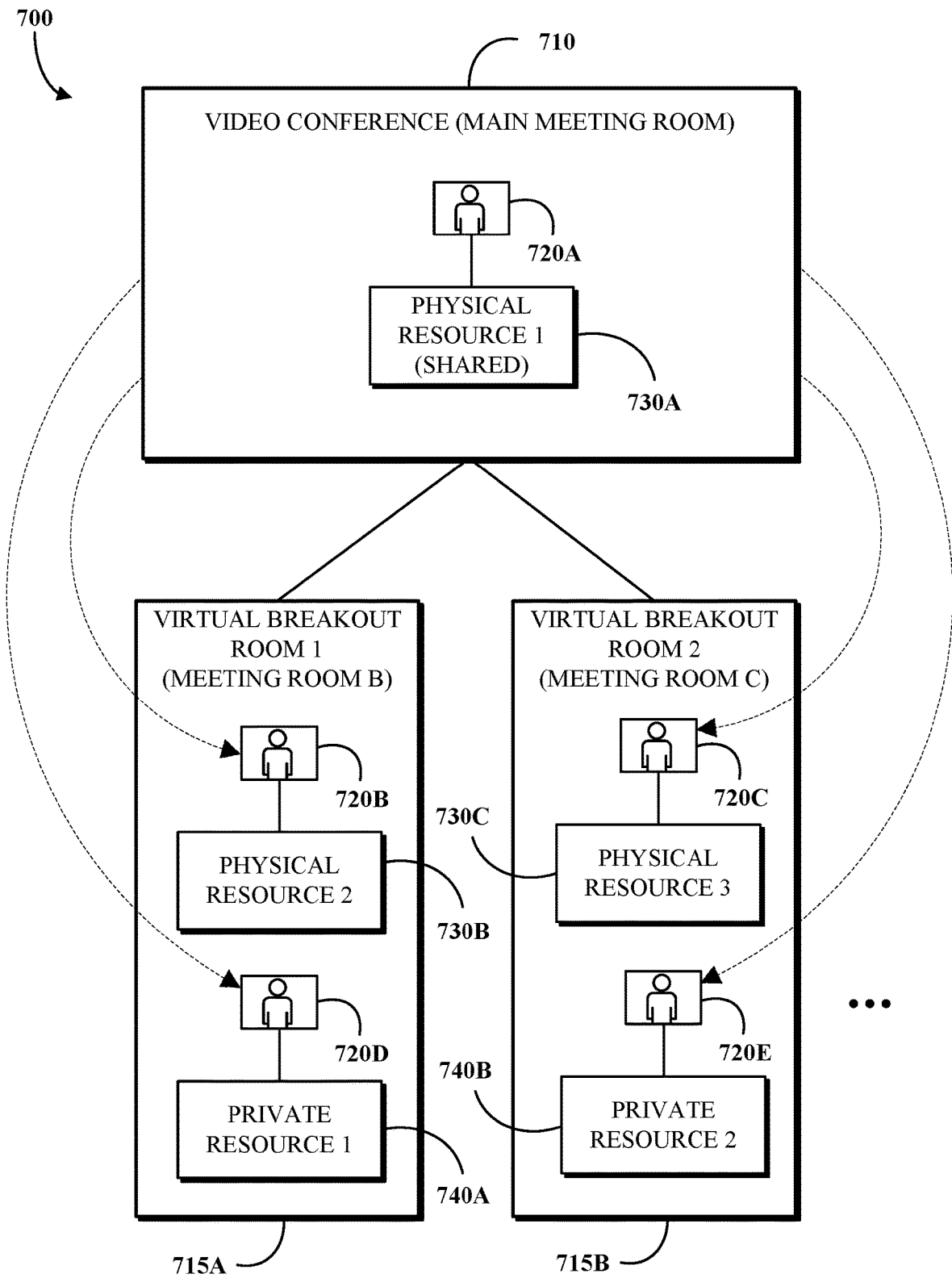
FIG. 7 is an illustration of an example of a system including a video conference with virtual breakout rooms in which participants are assigned to virtual breakout rooms and physical resources are allocated for use in connection with the virtual breakout rooms.

FIG. 7 is an illustration of an example of a system 700 including a video conference 710 with virtual breakout rooms, such as virtual breakout rooms 715A and 715B. The video conference 710 and the virtual breakout rooms 715A and 715B may be like the video conference 610 and the virtual breakout rooms 615A and 615B shown in FIG. 6, respectively. A first conference device, like the conference device 410A shown in FIG. 4, may be used to generate a first video stream associated with the video conference 710, like first video stream 510A shown in FIG. 5. The first conference device may be operated by multiple users in a same physical space (e.g., multiple in-person participants in a group), such as participants 720A through 720C. For example, the participants 720A through 720C may be individuals that are together in a classroom, office, conference room, or other meeting space, like the participants 520A through 520C shown in FIG. 5. The participants 720A through 720C may be using a first physical resource 730A (e.g., "physical resource 1," also being a shared physical resource among the participants 720A through 720C, like the shared physical resource 630 shown in FIG. 6). For example, the first physical resource 730A could comprise a reserved classroom or conference room with desks, chairs, and a computer including conferencing software integrated therein.

A second conference device, like the conference device 410B shown in FIG. 4, may be used to generate a second video stream associated with the video conference 710, like the second video stream 510B shown in FIG. 5. The second conference device may be operated by a single user in another physical space (e.g., a participant at a remote location) such as a participant 720D. For example, the participant 720D may be an individual that is alone in another classroom, office, conference room, or other meeting space, like the participant 520D shown in FIG. 5. The participant 720D may be using a first private physical resource 740A (e.g., like the first private physical resource 640A shown in FIG. 6). For example, the first private physical resource 740A could comprise a personal mobile device (e.g., a smartphone, laptop, or tablet) with conferencing software integrated therein. Additionally, a third conference device, like the conference device 410C shown in FIG. 4, may be used to generate a third video stream associated with the video conference 710, like the third video stream 510C shown in FIG. 5. The third conference device may be operated by another single user in yet another physical space (e.g., a participant at a remote location) such as a participant 720E. For example, the participant 720E may be another individual that is alone in a classroom, office, conference room, or other meeting space, like the participant 520E shown in FIG. 5. The participant 720E may be using a second private physical resource 740B (e.g., like the second private physical resource 640B shown in FIG. 6). For example, the second private physical resource 740B could comprise a personal mobile device (e.g., a smartphone, laptop, or tablet) with conferencing software integrated therein. Thus, the video conference 710 could comprise in-person participants (e.g., the participants 720A through 720C) and remote participants (e.g., the participant 720D and the participant 720D) in a hybrid model.

During the video conference 710, it may be desirable for the participants 720A through 720E to be separated into one or more virtual breakout rooms, such as the virtual breakout rooms 715A and 715B. The virtual breakout rooms may permit splitting the participants 720A through 720E into smaller side conferences. To reduce disruption to the conference process, and/or to ensure availability of spaces and/or devices for the participants, conferencing software (e.g., software associated with a server device like the server device 420 shown in FIG. 4) may execute to detect that multiple participants of a video conference are in a same physical space (e.g., the participants 720A through 720C using the first physical resource 730A). For example, the conferencing software may implement a facial recognition system to detect the individual participants 720A, 720B, and 720C in the first video stream. Responsive to detecting the individual participants 720A, 720B, and 720C, and detecting the individual participant 720D using the first private physical resource 740A and the individual participant 720E using the second private physical resource 740B, the conferencing software may assign one or more of the participants 720A through 720E to the virtual breakout rooms 715A and 715B. This may include assigning individual ones of the participants 720A through 720C in the same physical space to different virtual breakout rooms. For example, the participant 720B may be assigned to the virtual breakout room 715A, and the participant 720C may be assigned to the virtual breakout room 715B. Further, this may include assigning a remote participant to a virtual breakout room, such as assigning the participant 720D to the virtual breakout room 715A with the participant 720B and assigning the participant 720E to the virtual breakout room 715B with the participant 720C. Additionally, this may include not assigning a participant to a virtual breakout room, such as leaving the participant 720A in the main conference (e.g., the video conference 710). For example, the participant 720A could be a meeting host or moderator. Accordingly, in some configurations, the main conference (e.g., associated with the video conference 710) might not be allocated for use in connection with a virtual breakout room. In other configurations, the main conference may be allocated for use in connection with a virtual breakout room.

Additionally, the conferencing software may communicate with a reservation system, like the reservation system 430 shown in FIG. 4, to determine the availability of physical resources for use by the participants and to allocate the physical resources based on their availability. For example, the conferencing software may communicate with the reservation system to determine that a second physical resource 730B (e.g., "physical resource 2") and a third physical resource 730C (e.g., "physical resource 3") are available for use. The conferencing software may communicate with the reservation system to reserve the second physical resource 730B and the third physical resource 730C through the reservation system. The conferencing software may allocate the physical resources determined to be available to the participants for use in connection with the virtual breakout rooms. For example, the conferencing software may allocate the second physical resource 730B to the participant 720B for use in connection with the virtual breakout room 715A and may allocate the third physical resource 730C to the participant 720C for use in connection with the virtual breakout room 715B. Further, the conferencing software may communicate with a digital signage system, like the digital signage system 450 shown in FIG. 4, to cause a display of locations of the second physical resource 730B and the third physical resource 730C, such as for directing the participant 720B and the participant 720C to the physical resources that have been allocated.

In some implementations, the assignments of virtual breakout rooms and/or the allocations of physical resources, may be based on moving participants from a shared resource (e.g., the participants 720A, 720B, and 720C, initially sharing the first physical resource 730A, like the participants 620A, 620B, and 620C shown in FIG. 6) to non-shared resources (e.g., the participant 720A using the first physical resource 730A, the participant 720B using the second physical resource 730B, and the participant 720C using the third physical resource 730C, as shown in FIG. 7).

Figure 8:
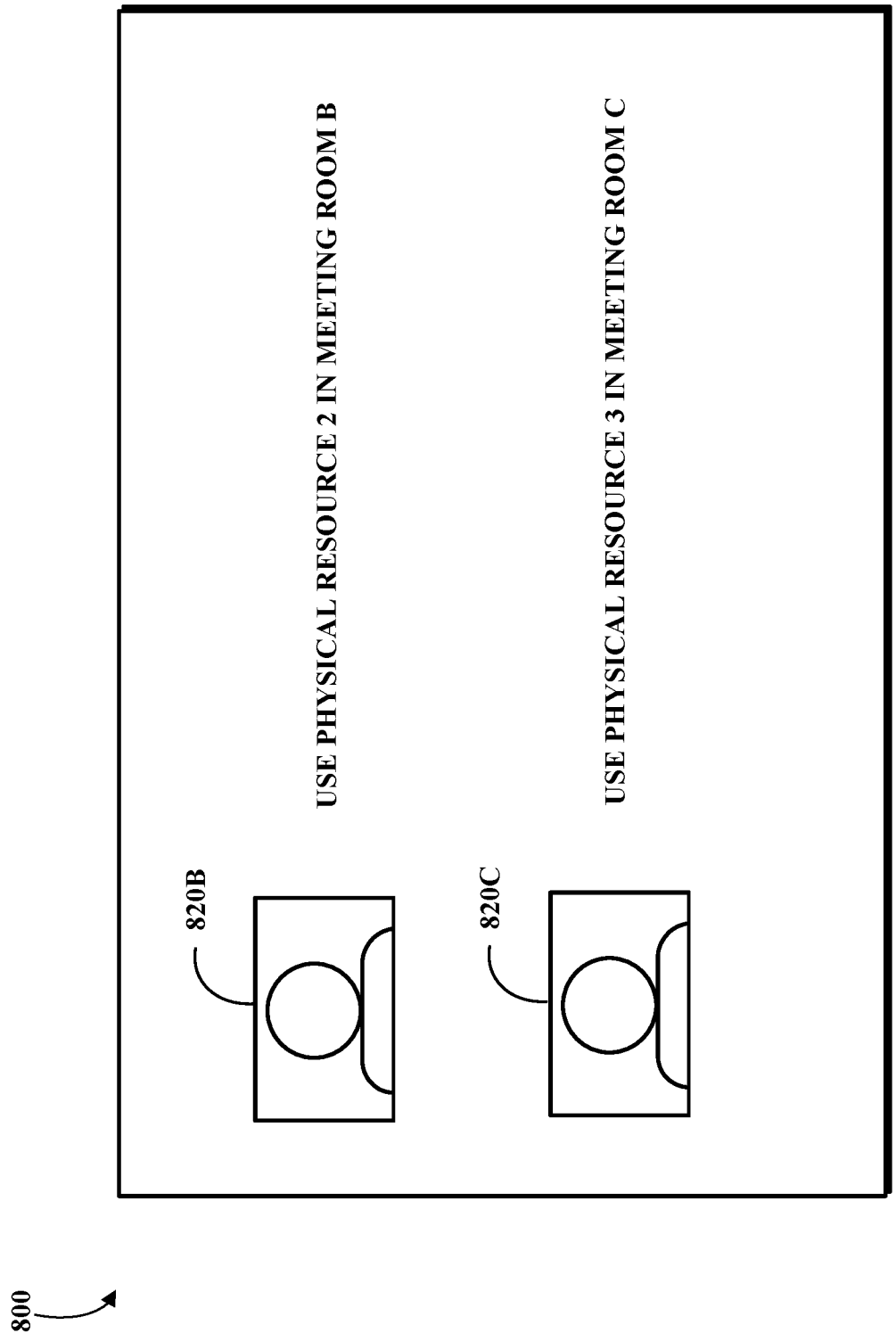
FIG. 8 is an illustration of an example of a graphical user interface indicating allocations of physical resources to participants.

FIG. 8 is an illustration of an example of a graphical user interface 800 indicating allocations of physical resources to participants (e.g., wayfinding instructions). The graphical user interface 800 could be output for display at a digital signage device like the digital signage devices 470A and 470B shown in FIG. 4. For example, a digital signage system, like the digital signage system 450 shown in FIG. 4, may push an update to a digital signage device to configure the graphical user interface 800. The graphical user interface 800 may be used to cause a display of locations of physical resources, such as for directing participants to the physical resources that have been allocated. For example, the graphical user interface 800 could be present in a same physical space being used by participants like the participants 720A through 720C shown in FIG. 7, such as in a main meeting room or a hallway outside of the main meeting room.

The graphical user interface 800 may show images of the participants with messages indicating their allocated physical resources. In some implementations, the images may be captured by a facial recognition system used to detect the individual participants in a video stream. For example, the graphical user interface 800 may show an image of a participant 820B with a message indicating that the participant 820B is to use "physical resource 2" at a first location (e.g., meeting room B); an image of a participant 820C with a message indicating that the participant 820C is to use "physical resource 3" at a second location (e.g., meeting room C); and so forth. The participant 820B and the participant 820C may be like the participant 720B and the participant 720C shown in FIG. 7. This may efficiently guide the participants to their allocated physical resources to facilitate joining their assigned virtual breakout rooms.

In some implementations, the images of the participants may be used by a facial recognition system to determine the identities of the participants. In such implementations, the graphical user interface 800 may indicate the names or other identifiers of the identified participants. Additionally, in some implementations, the digital signage service may dynamically change the graphical user interface 800 during the video conference (e.g., push updates), such as to cycle between indicating different allocations of physical resources and/or different participants.

Figure 9:
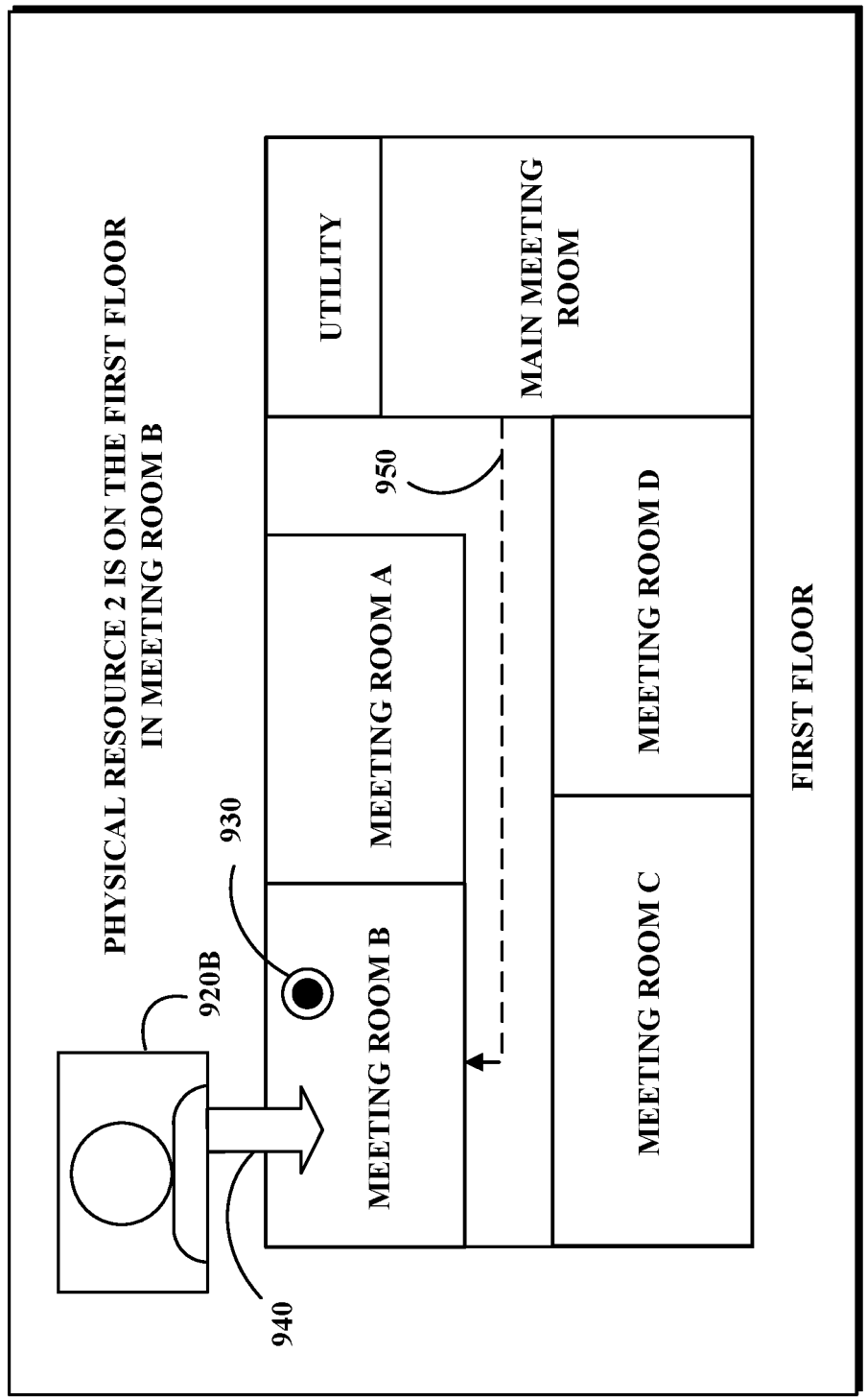
FIG. 9 is an illustration of an example of a graphical user interface indicating a location of a physical resource allocated to a participant.

FIG. 9 is an illustration of an example of a graphical user interface 900 indicating a location of a physical resource allocated to a participant (e.g., wayfinding instructions). The graphical user interface 900 could be output for display at a digital signage device like the digital signage devices 470A and 470B shown in FIG. 4. For example, a digital signage system, like the digital signage system 450 shown in FIG. 4, may push an update to a digital signage device to configure the graphical user interface 900. The graphical user interface 900 may be used to cause a display of locations of physical resources, such as for directing participants to the physical resources that have been allocated. For example, the graphical user interface 900 could be present in a same physical space being used by participants like the participants 720A through 720C shown in FIG. 7, such as in a main meeting room or a hallway outside of the main meeting room.

The graphical user interface 900 may show an image of the participant with a location of their allocated physical resource. In some implementations, the image may be captured by a facial recognition system used to detect the individual participant in a video stream. In some implementations, the location may appear as an icon 930 on a map (e.g., a workspace reservation map) where the participant is located (e.g., a map including the same physical space where the participant was detected and the physical space where the physical resource is located). For example, to dispatch a participant 920B to "physical resource 2," the graphical user interface 900 may show an image of the participant 920B along with the icon 930 on a map representing the location of physical resource 2 (e.g., meeting room B). The graphical user interface 900 could also show a link 940 between the image of the participant 920B and the icon 930 on the map, and/or overlay the image of the participant 920B on the map at the location of the physical resource, indicating the allocation of the physical resource to the participant 920B. The participant 920B may be like the participant 720B shown in FIG. 7. The graphical user interface 900 could also show directions 950 to the physical resource, such as from the same physical space where the participant was detected (e.g., "main meeting room") to the physical space where the physical resource is located (e.g., "meeting room B"). The graphical user interface 900 could also show a message indicating the location of the allocated physical resource, such as "physical resources 2 is on the first floor in meeting room B."

In some implementations, the image of the participant may be used by a facial recognition system to determine the identity of the participant. In such implementations, the graphical user interface 900 may indicate the name or other identifier of the identified participant (e.g., the participant 920B). Additionally, in some implementations, the digital signage service may dynamically change the graphical user interface 900 during the video conference (e.g., push updates), such as to cycle between indicating different locations of physical resources.

Figure 10:
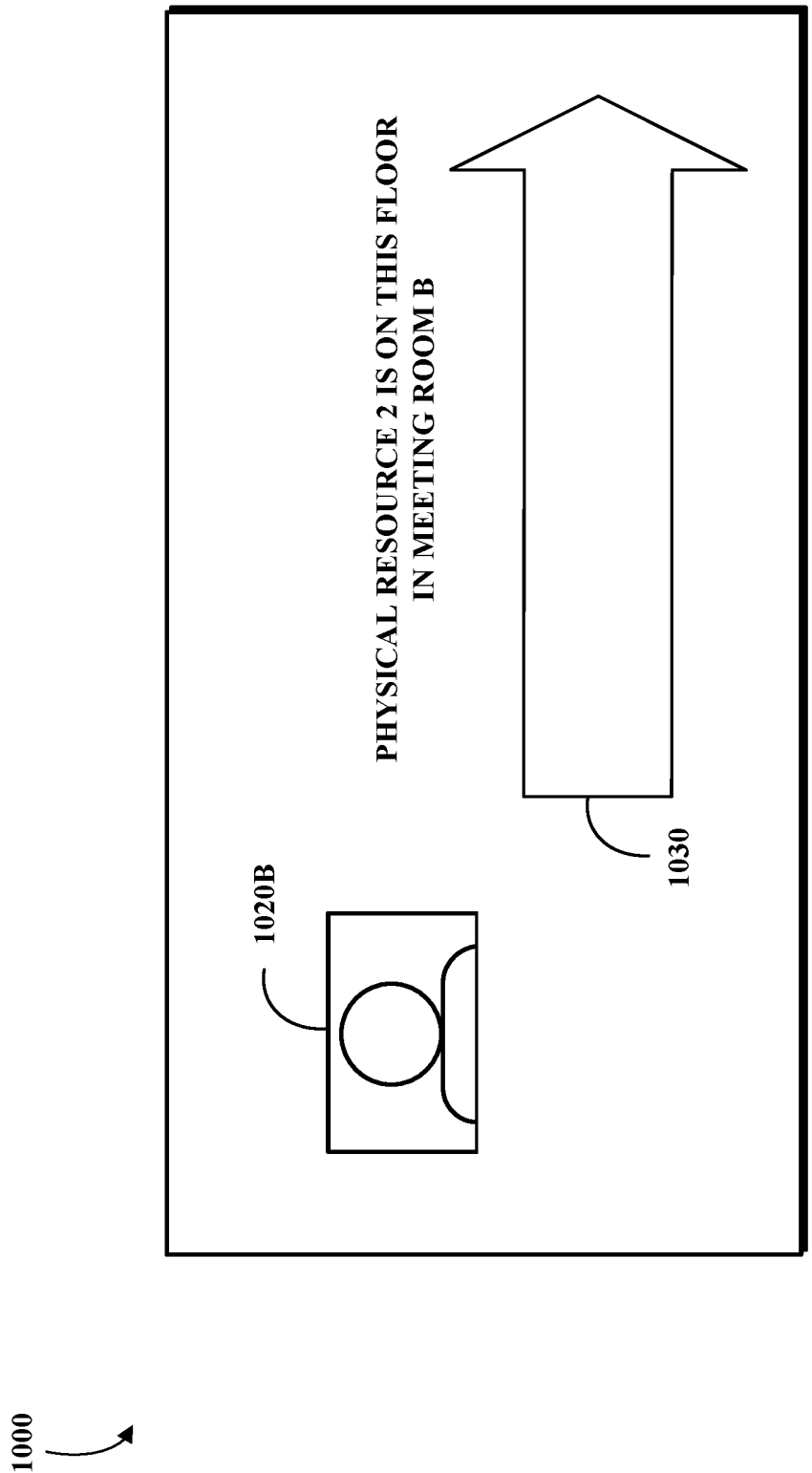
FIG. 10 is an illustration of an example of a graphical user interface indicating directions to a physical resource allocated to a participant.

FIG. 10 is an illustration of an example of a graphical user interface 1000 indicating directions to a physical resource corresponding to a virtual breakout room. For example, the graphical user interface 1000 may provide directions to the physical resource that is allocated to a participant (e.g., wayfinding instructions). The graphical user interface 1000 could be configured on a digital signage device like the digital signage devices 470A and 470B shown in FIG. 4. For example, a digital signage system, like the digital signage system 450 shown in FIG. 4, may push an update to a digital signage device to configure the graphical user interface 1000. The graphical user interface 1000 may be used to cause a display of locations of physical resources, such as for directing participants to the physical resources that have been allocated. For example, the graphical user interface 1000 could be present in a same physical space being used by participants like the participants 720A through 720C shown in FIG. 7, such as in a main meeting room or a hallway outside of the main meeting room.

The graphical user interface 1000 may show an image of the participant with a direction to their allocated physical resource (e.g., breadcrumbs to follow). In some implementations, the image may be captured by a facial recognition system used to detect the individual participant in a video stream. In some implementations, the direction may appear as an icon 1030 indicating a physical direction of the allocated physical resource relative to a premises, such as a green arrow indicating the participant should walk eastward in a building to reach their allocated physical resource. For example, to dispatch a participant 1020B to "physical resource 2," the graphical user interface 1000 may show an image of the participant 1020B along with the icon 1030 indicating a physical direction of physical resource 2 (e.g., meeting room B). The participant 1020B may be like the participant 720B shown in FIG. 7. The graphical user interface 1000 could also show a message indicating the location of the allocated physical resource, such as "physical resources 2 is on the first floor in meeting room B."

In some implementations, the image of the participant may be used by a facial recognition system to determine the identity of the participant. In such implementations, the graphical user interface 1000 may indicate the name or other identifier of the identified participant (e.g., the participant 1020B). Additionally, in some implementations, the digital signage service may dynamically change the graphical user interface 1000 during the video conference (e.g., push updates), such as to cycle between indicating different directions to physical resources.

Figure 11:
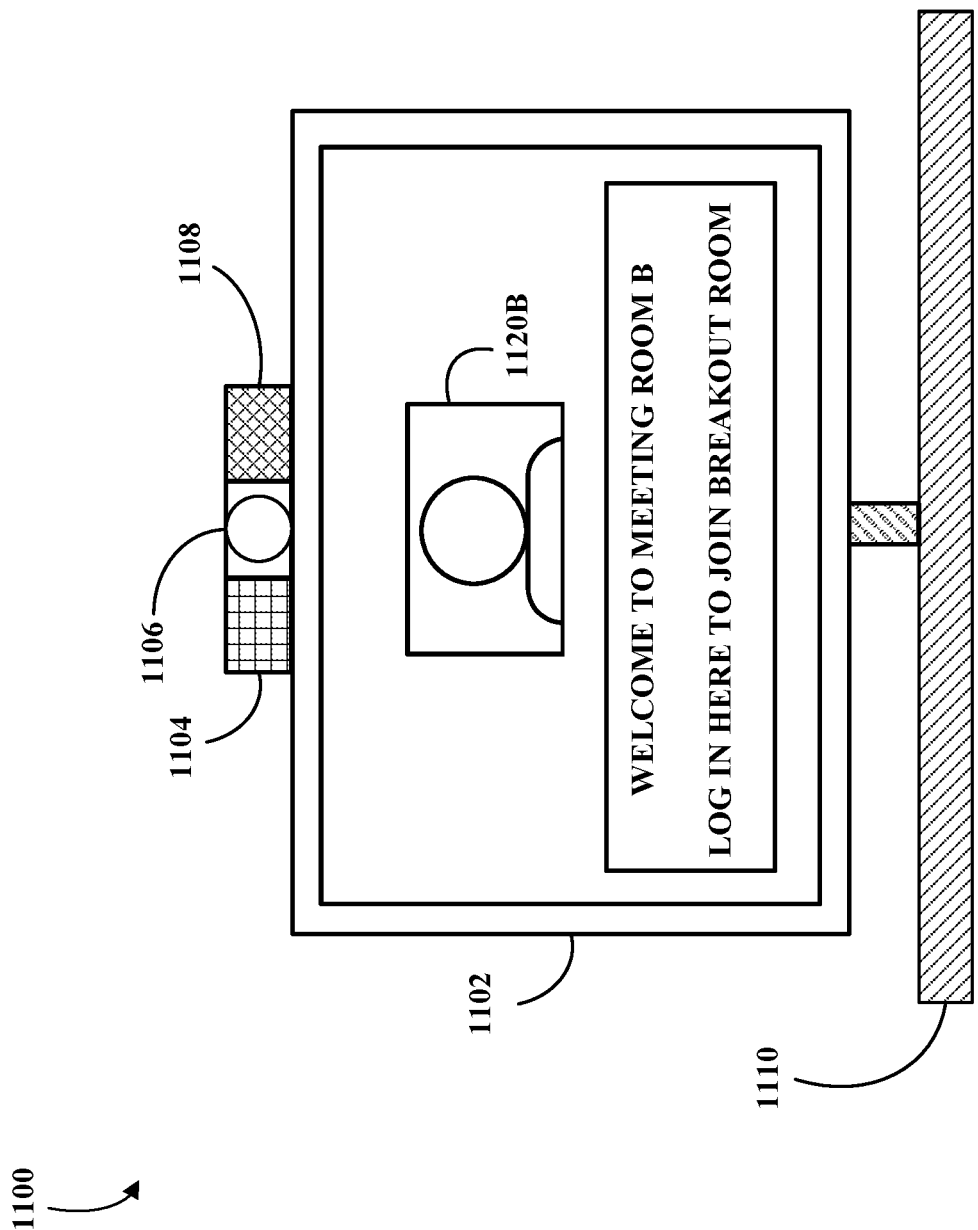
FIG. 11 is an illustration of an example of a physical resource allocated to a participant.

FIG. 11 is an illustration of an example of a physical resource 1100 allocated to a participant. For example, the physical resource 1100 could be allocated to a participant 1120B like the participant 720B shown in FIG. 7. The physical resource 1100 could comprise a combination of computing resources, such as a computer 1102 having a microphone 1104, a camera 1106, and a speaker 1108 (e.g., a computing resource), and non-computing resources, such as a room having a desk 1110 and a chair (e.g., a meeting room hot desk with video capabilities). The physical resource 1100 may be used to connect the participant 1120B to a virtual breakout room, like the virtual breakout room 715A shown in FIG. 7. The physical resource 1100 may be in a location that is different than the same physical space where the participant 720B was detected.

The physical resource 1100 may display an image of the participant 1120B with a message indicating that the physical resource 1100 is allocated to the participant 1120B (e.g., the participant 1120B will see their image on the physical resource 1100 that is reserved for them). The image may be captured by a facial recognition system used to detect the participant 1120B in a video stream. This may efficiently guide the participant 1120B to the physical resource 1100 to facilitate joining their assigned virtual breakout room. When the participant 1120B accesses the physical resource 1100, the participant 1120B may join directly into the virtual breakout room to which they are assigned using the physical resource (e.g., the physical resource 1100) to which they are allocated.

In some implementations, the image of the participant 1120B may be used to determine the identity of the participant 1120B. In such implementations, the physical resource 1100 may display the name or other identifier of the participant 1120B. Further, in such implementations, the name or other identifier of the participant 1120B may be used to configure the physical resource 1100 for the participant 1120B. For example, the identity may be used to push configurations to the computer 1102 for use by the participant 1120B, such as by updating the display of the computer 1102 with the name of the participant 1120B, and/or by installing or configuring software on the computer 1102 that may be used by the participant 1120B (e.g., client-side user specific configurations associated with the participant 1120B). In some implementations, the identity may be used to authenticate the participant 1120B using the computer 1102 to permit connecting the computer 1102 to the virtual breakout room with security. Further, in such implementations, the computer 1102 may permit the participant 1120B to access the computer 1102 (e.g., to securely log in) by using the camera 1106. For example, the participant 1102B may access the computer 1102 by showing their face and/or a marker (e.g., a quick response (QR) code) to the camera 1106.

Figure 12:
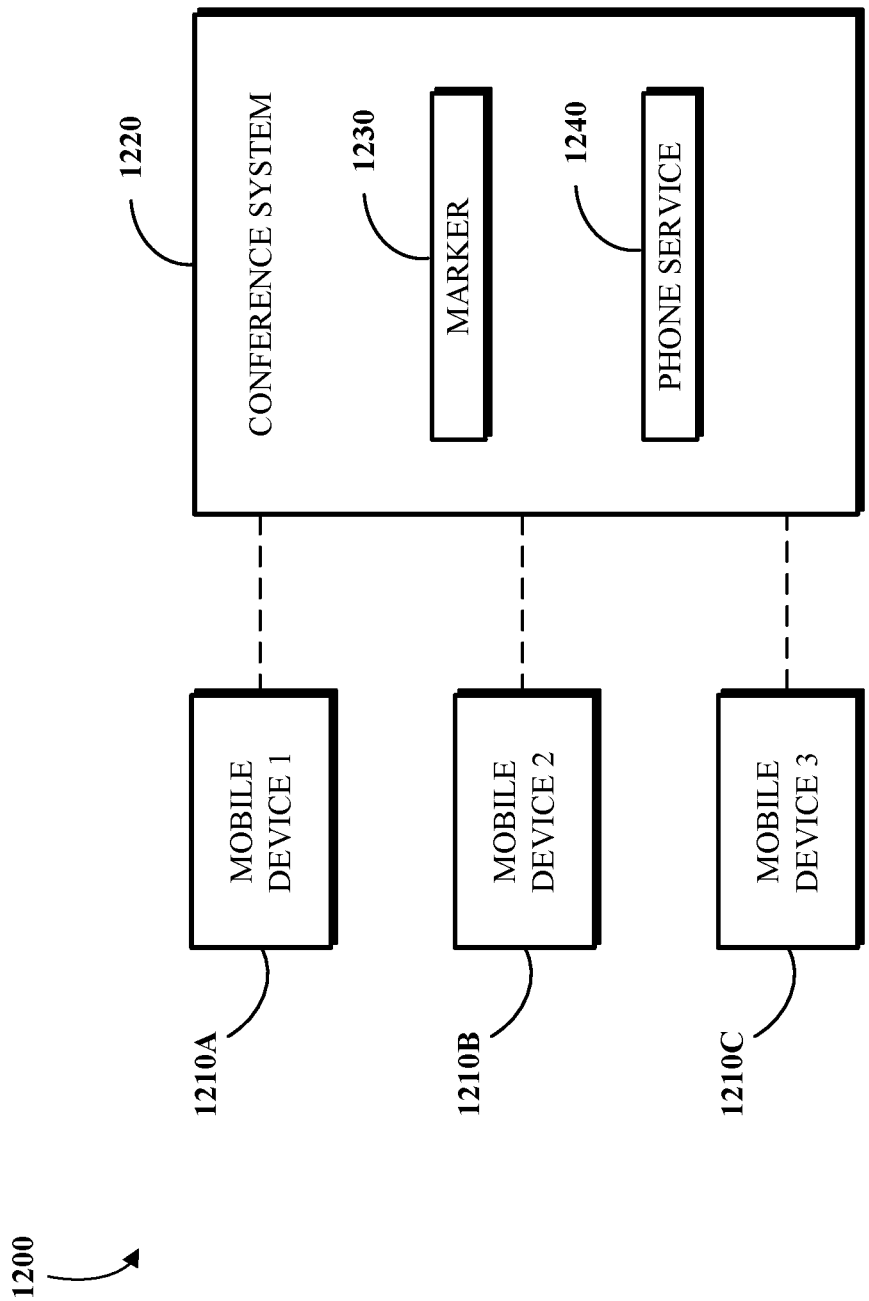
FIG. 12 is a block diagram of an example of a system for allocating physical resources in which the physical resources comprise mobile devices associated with participants of a video conference.

FIG. 12 is a block diagram of an example of a system 1200 for allocating physical resources comprising mobile devices, such as mobile devices 1210A through 1210C, for use in connection with virtual breakout rooms. For example, a conference system 1220, which may include a server device, a reservation system, and/or a digital signage system (like the server device 420, the reservation system 430, and/or the digital signage system 450 shown in FIG. 4), may determine that physical resources are unavailable for one or more participants of a video conference (e.g., like the participants 520A through 520C shown in FIG. 5). In this case, the conference system 1220 may utilize the mobile devices 1210A through 1210C associated with one or more of the participants (e.g., private physical resources belonging to the participants, such as smartphones, laptops, and/or tablets) as the allocated physical resources for the virtual breakout rooms. For example, the mobile devices 1210A through 1210C could be private physical resources belonging to participants like the participants 520A through 520C shown in FIG. 5, respectively.

In some implementations, the conference system 1220 may display a marker 1230, such as a quick response (QR) code, in a same physical space as the multiple participants. The participants may individually use the mobile devices 1210A through 1210C to scan the marker 1230 and/or to establish their identity with the conference system 1220. The marker 1230, with the established identity of the participants, may be used to dynamically assign the participants to virtual breakout rooms with the mobile devices 1210A through 1210C being allocated to the participants for use in connection with the virtual breakout rooms.

In some implementations, the mobile devices 1210A through 1210C may transmit a unique ultrasonic frequency to inform the conference system 1220 that it would like to join a virtual breakout room. The conference system 1220 may then communicate with the mobile devices 1210A through 1210C to establish a connection to the virtual breakout room. In some implementations, the conference system 1220 may implement a phone service 1240 (e.g., a telecommunications service, such as cellular service) to call the mobile devices 1210A through 1210C for the participants to join their assigned virtual breakout rooms.

Figure 13:
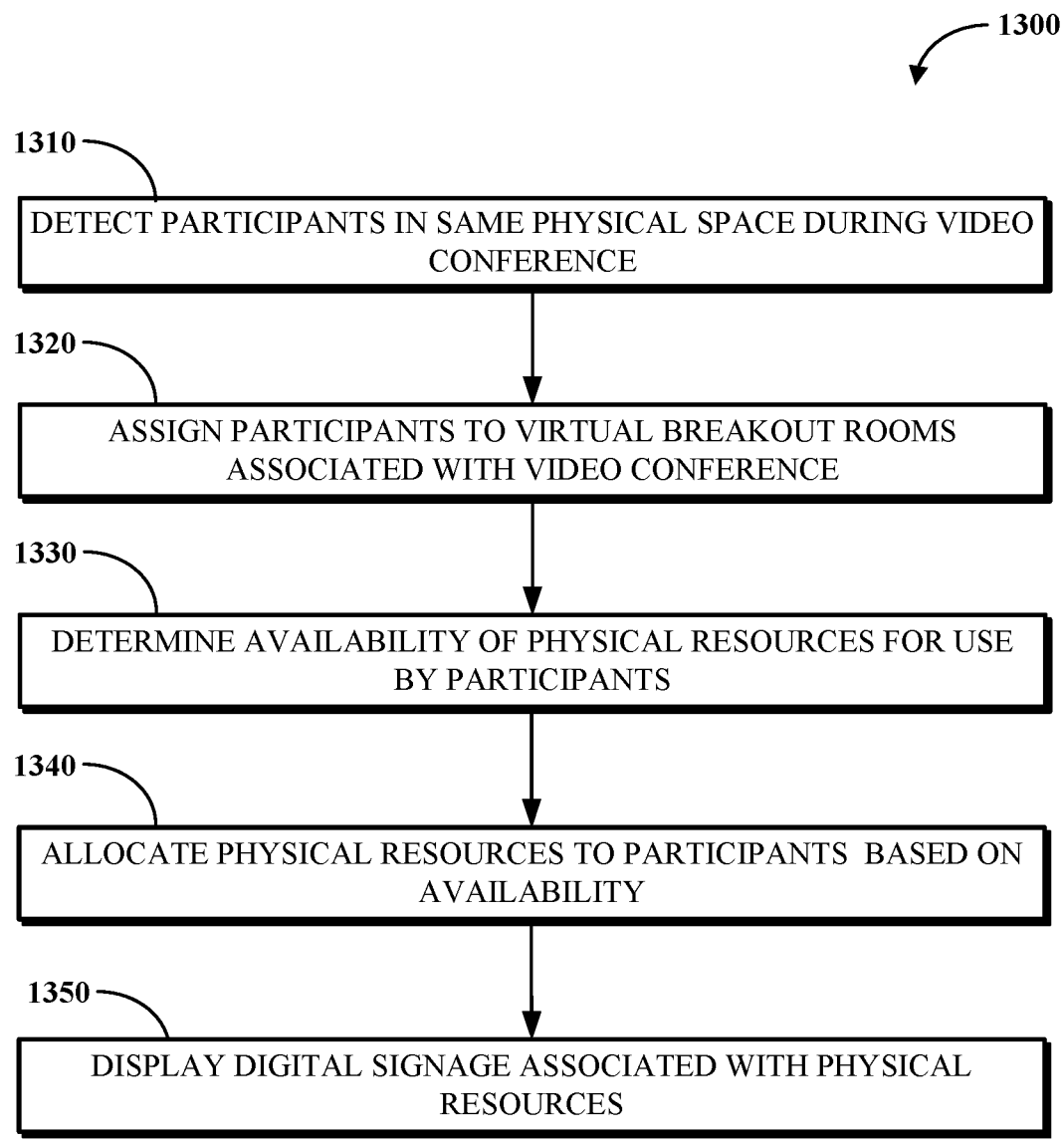
FIG. 13 is a flowchart of an example of a technique for allocating physical resources to participants for use in connection with virtual breakout rooms.

To further describe some implementations in greater detail, reference is next made to examples of techniques which may be performed by or using a system that allocates a physical resource to a participant for use in connection with a virtual breakout room. FIG. 13 is a flowchart of an example of a technique 1300 for allocating a physical resource to a participant for use in connection with a virtual breakout room. The technique 1300 can be executed using computing devices, such as the systems, hardware, and software described with respect to FIGS. 1-12. The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1310, conferencing software executing in a system may detect that multiple participants are in a same physical space during a video conference. The conferencing software may comprise client-side conferencing software, server-side conferencing software, and/or a combination thereof. In some implementations, to detect that multiple participants are in a same physical space, the conferencing software may implement a facial recognition system to detect the individual participants among multiple participants present in a video stream associated with a conference device, such as a video stream associated with one of the conference devices 410A through 410D shown in FIG. 4. In some implementations, images associated with the participants of the video conference (e.g., faces of the participants) may be captured and framed by the conferencing software. For example, the images may be captured by the facial recognition system used to detect the individual participants among multiple participants present in a video stream (e.g., in a same physical space).

At 1320, the conferencing software may assign the participants of the video conference to virtual breakout rooms associated with the video conference. The participants may be assigned to virtual breakout rooms manually (e.g., by one or more participants of the video conference, such as a meeting host or moderator designating which virtual breakout room to put one or more participants into) and/or automatically (e.g., by the conferencing software designating which virtual breakout room to put one or more participants into). For example, the conferencing software may assign the participants, individually, to virtual breakout rooms, including assigning individual participants that are together in a same physical space to different virtual breakout rooms. In some implementations, the assignment of participants to virtual breakout rooms may occur before a video conference starts. For example, participants may be assigned to virtual breakout rooms based on the participants determined to be in attendance during the video conference (e.g., in an ad hoc manner). In some implementations, the assignment of participants to virtual breakout rooms may occur before a video conference starts. For example, the conferencing software may use a machine learning model to predict the participants of a video conference, to determine assignments of participants to virtual breakout rooms based on the prediction, and/or to allocate the physical resources to the participants based on the prediction. In some configurations, the conferencing software may assign participants to virtual breakout rooms corresponding to physical resources based on the number of physical resources that are available. For example, if only one physical resource is available, all local participants may be assigned to the same virtual breakout room corresponding to the physical resource.

In some implementations, the conferencing software may reference a higher level data set to determine assignments of participants to virtual breakout rooms. For example, the conferencing software may reference one or more files, such as a real-time transcription of the video conference, project-related data (e.g., organizational charts, rosters, presentations, product information), past messages (e.g., transcribed voice mails, instant messages, text messages, chats), or other historical data (e.g., a transcription of a past video conference) to determine assignments of participants to virtual breakout rooms. The conferencing software may use text recognition software to analyze the files to determine the physical resources. The conferencing software may use the files to determine the assignments of participants to virtual breakout rooms. The conferencing software may determine the assignments of participants to virtual breakout rooms based on common interests of participants, locations of participants, work functions, study functions, interests of participants, and/or relationships of participants in an organization. In some implementations, the conferencing software may assign participants to virtual breakout rooms so that at least two participants are present in a virtual breakout room (e.g., a participant is not alone in a virtual breakout room, although the participant may be alone in a physical resource allocated to that participant for the virtual breakout room). For example, the conferencing software may count the participants that are available and determine the assignments based on the count. In some implementations, the conferencing software may execute to notify a host or moderator of the video conference as to whether sufficient participants are available.

Additionally, the assignment of participants to virtual breakout rooms may be adjusted one or more times during a video conference, such as by adjusting the assignment of participants to virtual breakout rooms based on changes in attendance by participants (e.g., participants joining and leaving the video conference). In some implementations, the assignment of participants to virtual breakout rooms may be automatically generated and/or adjusted by the conferencing software without user intervention (e.g., programmatically). In some implementations, the assignment of participants to virtual breakout rooms may be manually generated and/or adjusted by one or more participants of the video conference, such as the meeting host or moderator.

At 1330, the conferencing software may determine the availability of physical resources for the participants to use in connection with the virtual breakout rooms. For example, the conferencing software may communicate with a reservation system like the reservation system 430 shown in FIG. 4 to determine the availability of physical resources. The reservation system could execute reservation software (e.g., which may respond to calls from the conferencing software) to determine the availability of physical resources which may be specified in a physical resource data structure. The physical resources may be associated with physical locations. The reservation system may implement a calendaring system to reserve physical resources. The calendaring system may be used to indicate and/or to determine the availability and/or the unavailability of physical resources in the physical resource data structure 440, such as by date and/or time. Based on a determined availability and/or location of the physical resources, the conferencing software may reserve one or more of the physical resources.

At 1340, the conferencing software may allocate the physical resources to the participants for use in connection with the virtual breakout rooms based on the availability. The physical resources may be allocated to participants manually (e.g., by one or more participants, such as a meeting host or moderator allocating one or more physical resources to one or more participants) and/or automatically (e.g., by the conferencing software allocating one or more physical resources to one or more participants). For example, the conferencing software may allocate the physical resources to the participants based on the location and/or availability of the physical resources as indicated by the reservation system. A physical resource may be allocated to a single participant and, in some implementations, to multiple participants (e.g., a shared physical resource). In some implementations, the allocation of physical resources to participants may occur before a video conference starts. For example, the physical resources may be allocated to the participants based on the participants determined to be in attendance during the video conference (e.g., in an ad hoc manner).

In some implementations, the conferencing software may reference a higher level data set to determine allocations of physical resources to participants. For example, the conferencing software may reference one or more files, such as a real-time transcription of the video conference, project-related data (e.g., organizational charts, rosters, presentations, product information), past messages (e.g., transcribed voice mails, instant messages, text messages, chats), or other historical data (e.g., a transcription of a past video conference) to process contextual information to determine allocations of physical resources to participants. The conferencing software may use text recognition software to analyze the files to determine the physical resources. The conferencing software may use the files to determine the allocation of physical resources and/or to configure the physical resources. The conferencing software may determine the allocation of physical resources and/or configure the physical resources based on common interests of participants, locations of participants, work functions, study functions, interests of participants, and/or relationships of participants in an organization. In some implementations, the conferencing software may allocate one or more physical resources to one participant (e.g., an individual) and/or to multiple participants (e.g., a group). For example, the conferencing software may count the participants that are available and determine the allocations based on the count. In some implementations, the conferencing software may execute to notify a host or moderator of the video conference as to whether sufficient physical resources are available.

Additionally, the allocation of physical resources to participants may be adjusted one or more times during a video conference, such as by adjusting the allocation of physical resources based on changes in attendance by participants (e.g., participants joining and leaving the video conference). In some implementations, the allocation of physical resources to participants may be automatically generated and/or adjusted by the conferencing software without user intervention (e.g., programmatically). In this way, a meeting host or moderator may rely on the conferencing software to learn the physical resources that may be available. In some implementations, the allocation of physical resources to participants may be manually generated and/or adjusted by one or more participants of the video conference, such as the meeting host or moderator. In this way, the meeting host or moderator may take advantage of their own knowledge of the physical resources that may be available.

At 1350, the conferencing software may display digital signage associated with the physical resources. For example, the conferencing software may communicate with a digital signage system like the digital signage system 450 shown in FIG. 4 to cause a display of locations of physical resources, such as for directing participants to the physical resources that have been allocated. The digital signage system could execute digital signage software (e.g., which may respond to calls from the conferencing software) to determine the location and/or availability of digital signage devices like the digital signage devices 470A and 470B shown in FIG. 4. For example, the location and/or availability may be specified in a digital signage data structure. The digital signage system may receive the allocations of physical resources from the conferencing software. The digital signage system may also receive and/or determine the locations and/or directions associated with the physical resources. The digital signage system may push updates to the digital signage devices, based on their availability, that cause the digital signage devices to display the allocations, locations, and/or directions. In some implementations, the digital signage system may push updates to one or more conference devices associated with one or more participants (e.g., the digital signage system may push updates to a display associated with a conference device like the conference device 410A shown in FIG. 4). In some configurations, the digital signage may send a map location/notification to a mobile device of a participant, allowing the participant to use their mobile device for directions to the physical resource.

In some implementations, the conferencing software may cause a shared conference device in a same physical space (e.g., the conference device 410A) to output the digital signage within a graphical user interface of the conferencing software. In some implementations, the conferencing software may cause a digital signage device located at the premises (e.g., in a main meeting room or a hallway outside of the main meeting room) to output the digital signage within a graphical user interface of the conferencing software. In some implementations, the conferencing software may cause one or more mobile devices of the participants to output the digital signage within a graphical user interface of the conferencing software. In some implementations, the images of the participants may be used by the digital signage system, such as to display pictures of participants to which physical resources have been allocated, to display pictures of participants in connection with locations of their allocated physical resources, and/or to display pictures of participants in connection with directions to their allocated physical resources.

Figure 14:
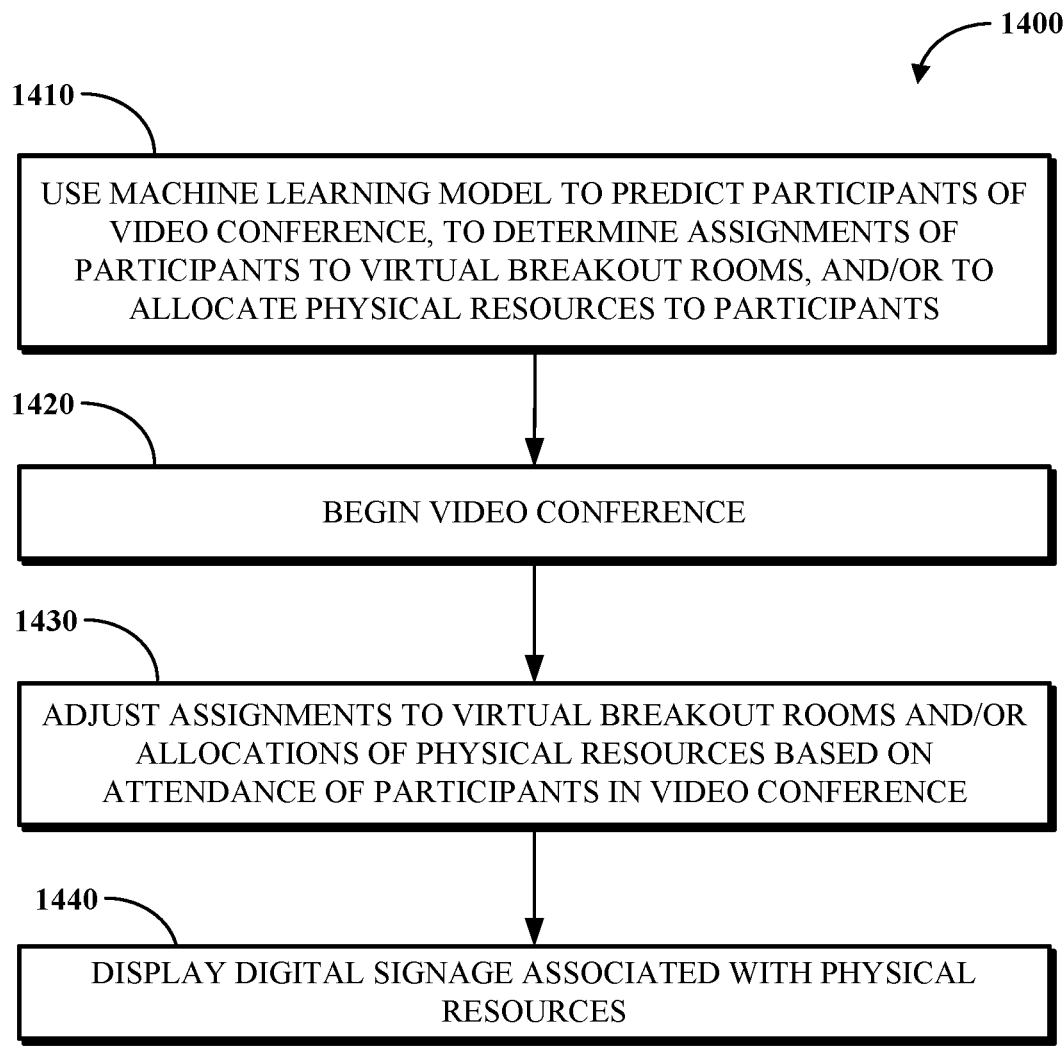
FIG. 14 is a flowchart of another example of a technique for allocating physical resources to participants for use in connection with virtual breakout rooms.

FIG. 14 is a flowchart of another example of a technique 1400 for allocating a physical resource to a participant for use in connection with a virtual breakout room. The technique 1400 can be executed using computing devices, such as the systems, hardware, and software described with respect to FIGS. 1-12. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1410, conferencing software executing in a system may use a machine learning model to predict participants of a video conference, to determine assignments of the participants to virtual breakout rooms, and/or to determine availability of physical resources for use in connection with the virtual breakout rooms. The conferencing software may comprise client-side conferencing software, server-side conferencing software, and/or a combination thereof. In some implementations, the machine learning model may be trained using a higher level data set. For example, the machine learning model may be trained using one or more files, such as a transcription of a past video conference, project-related data (e.g., organizational charts, rosters, presentations, product information), past messages (e.g., transcribed voice mails, instant messages, text messages, chats), or other historical data to process contextual information. The conferencing software may use the machine learning model to predict the participants of a video conference, to determine assignments of participants to virtual breakout rooms based on the prediction, and/or determine allocations of the physical resources based on the prediction. For example, the conferencing software may provide an input to the machine learning model, such as a list of participants that are invited to a video conference and/or a date and a time of a scheduled video conference, to make the predictions and the determinations using the machine learning model. The conferencing software may communicate with a reservation system like the reservation system 430 shown in FIG. 4 to determine the availability of the physical resources, to reserve the physical resources, and/or to allocate the physical resources based on the prediction. In some implementations, the conferencing software may use the machine learning model to assign the participants to virtual breakout rooms and/or to allocate physical resources to the participants so that at least two participants are present in a virtual breakout room (e.g., a participant is not alone in a virtual breakout room). For example, the conferencing software may use the machine learning model to count the participants that will be available and determine the assignments and/or the allocations based on the count. In some implementations, the conferencing software may use the machine learning model to notify a host or moderator of the video conference as to whether sufficient participants and/or sufficient physical resources will be available At 1420, the conferencing software may begin the video conference. The video conference may be started manually (e.g., by one or more participants of the video conference, such as a meeting host or moderator) or automatically (e.g., by the conferencing software). The video conference may be started at a scheduled time (e.g., at a time corresponding to a reservation of physical resources to be used during the video conference, such as by the reservation system 430 shown in FIG. 4). The video conference may include participants, and in many cases, the participants may be as predicted. Additionally, participants may join and leave the video conference as desired.

At 1430, the conferencing software may adjust the assignments of the participants to the virtual breakout rooms and/or the allocation of physical resources to the participants based on the attendance of participants in the video conference. The assignment of participants to virtual breakout rooms may be adjusted one or more times during the video conference, such as adjusting the assignment of participants to virtual breakout rooms based on changes in attendance by participants (e.g., participants joining and leaving the video conference). In some implementations, the assignment of participants to virtual breakout rooms may be automatically generated and/or adjusted by the conferencing software without user intervention (e.g., programmatically). In some implementations, the assignment of participants to virtual breakout rooms may be manually generated and/or adjusted by one or more participants of the video conference, such as a meeting host or moderator. Additionally, the allocation of physical resources to participants may be adjusted one or more times during the video conference, such as adjusting the allocation of physical resources based on changes in attendance by participants (e.g., participants joining and leaving the video conference). In some implementations, the allocation of physical resources to participants may be automatically generated and/or adjusted by the conferencing software without user intervention (e.g., programmatically). In some implementations, the allocation of physical resources to participants may be manually generated and/or adjusted by one or more participants of the video conference, such as a meeting host or moderator.

At 1440, the conferencing software may display digital signage associated with the physical resources. For example, the conferencing software may communicate with a digital signage system like the digital signage system 450 shown in FIG. 4 to cause a display of locations of physical resources, such as for directing participants to the physical resources that have been allocated. The digital signage system could execute digital signage software (e.g., which may respond to calls from the conferencing software) to determine the location and/or availability of digital signage devices like the digital signage devices 470A and 470B shown in FIG. 4. For example, the location and/or availability may be specified in a digital signage data structure. The digital signage system may receive the allocations of physical resources from the conferencing software. The digital signage system may also receive and/or determine the locations and/or directions associated with the physical resources. The digital signage system may push updates to the digital signage devices, based on their availability, that cause the digital signage devices to display the allocations, locations, and/or directions.

In some implementations, the conferencing software may cause a digital signage device located at a premises (e.g., in a main meeting room or a hallway outside of the main meeting room) to output the digital signage within a graphical user interface of the conferencing software. In some implementations, the conferencing software may cause one or more mobile devices of the participants to output the digital signage within a graphical user interface of the conferencing software. In some implementations, the images of the participants may be used by the digital signage system, such as to display pictures of participants to which physical resources have been allocated, to display pictures of participants in connection with locations of their allocated physical resources, and/or to display pictures of participants in connection with directions to their allocated physical resources.

Some implementations may include a method that includes: detecting multiple participants of a video conference in a same physical space; assigning a first participant of the multiple participants to a virtual breakout room associated with the video conference; determining an availability of a physical resource for the first participant to use in connection with the virtual breakout room; and allocating the physical resource to the first participant for use in connection with the virtual breakout room based on the availability. In some implementations, the method may include communicating with a reservation system to determine the availability of the physical resource for the first participant; and reserving the physical resource for the first participant upon determining that the physical resource is available. In some implementations, the same physical space may be a first physical space, and the physical resource may include a second physical space, the method may include: providing directions to the second physical space allocated to the first participant. In some implementations, the method may include capturing an image of the first participant from a video stream associated with the video conference; and displaying the image with an indication that the physical resource is allocated to the first participant associated with the image. In some implementations, the method may include pushing an update to a digital signage device, wherein the update causes the digital signage device to display a location of the physical resource for directing the first participant to the physical resource. In some implementations, the physical resource may include a computing resource, and the method may include connecting the computing resource to the virtual breakout room based on an authentication of the first participant using the computing resource. In some implementations, the physical resource may include a computing resource, and the method may include determining an identity of the first participant using facial recognition; and configuring the computing resource for use by the first participant based on the identity. In some implementations, the same physical space may be a first physical space, and the physical resource may include a second physical space, and the method may include capturing an image of the first participant from a video stream associated with the video conference; and displaying the image of the first participant to a display associated with a computing resource, wherein the computing resource is located in the second physical space. In some implementations, detecting the multiple participants in the same physical space may include detecting the first participant and a second participant within a video stream transmitted from a shared computing resource associated with the same physical space, wherein the allocation of the physical resource to the first participant is based on the shared computing resource being used for both of the first participant and the second participant. In some implementations, the physical resource may include a computing resource, and the method may include pushing a configuration associated with the first participant to the computing resource based on the allocation of the computing resource to the first participant. In some implementations, the virtual breakout room may be a first virtual breakout room, and the physical resource is a first physical resource, and the method may include assigning a second participant of the multiple participants to a second virtual breakout room associated with the video conference; determining an availability of a second physical resource for the second participant to use in connection with the second virtual breakout room; and allocating the second physical resource to the second participant for use in connection with the second virtual breakout room based on the availability. In some implementations, the method may include using a machine learning model to determine that the first participant will participate in the video conference; and allocating the physical resource to the first participant based on the determination. In some implementations, the same physical space may be a first physical space, and the method may include detecting a remote participant of the video conference in a second physical space; and assigning the remote participant to the virtual breakout room.

Some implementations may include an apparatus that includes: a memory; and a processor configured to execute instructions stored in the memory to: detect multiple participants of a video conference in a same physical space; assign a first participant of the multiple participants to a virtual breakout room associated with the video conference; determine an availability of a physical resource for the first participant to use in connection with the virtual breakout room; and allocate the physical resource to the first participant for use in connection with the virtual breakout room based on the availability. In some implementations, the processor may be further configured to execute instructions stored in the memory to communicate with a reservation system to determine the availability of the physical resource for the first participant; and reserve the physical resource for the first participant upon determining that the physical resource is available. In some implementations, the same physical space is a first physical space, the physical resource comprises a second physical space, and the processor may be further configured to execute instructions stored in the memory to provide directions to the second physical space allocated to the first participant. In some implementations, the processor is further configured to execute instructions stored in the memory to capture an image of the first participant from a video stream associated with the video conference; and display the image with an indication that the physical resource is allocated to the first participant associated with the image.

Some implementations may include a non-transitory computer readable medium that stores instructions operable to cause one or more processors to perform operations that include: detecting multiple participants of a video conference in a same physical space; assigning a first participant of the multiple participants to a virtual breakout room associated with the video conference; determining an availability of a physical resource for the first participant to use in connection with the virtual breakout room; and allocating the physical resource to the first participant for use in connection with the virtual breakout room based on the availability. In some implementations, the operations may include communicating with a reservation system to determine the availability of the physical resource for the first participant; and reserving the physical resource for the first participant upon determining that the physical resource is available. In some implementations, the same physical space may be a first physical space, and the physical resource may comprise a second physical space, and the operations may include providing directions to the second physical space allocated to the first participant. In some implementations, the operations may include capturing an image of the first participant from a video stream associated with the video conference; and displaying the image with an indication that the physical resource is allocated to the first participant associated with the image.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting multiple participants of a video conference in a first physical space;
   assigning a first participant of the multiple participants to a virtual breakout room associated with the video conference;
   determining an availability of a physical resource for the first participant to use in connection with the virtual breakout room, the physical resource comprising a second physical space;
   allocating the physical resource to the first participant for use in connection with the virtual breakout room based on the availability;
   capturing an image of the first participant from a video stream associated with the video conference; and
   displaying the image of the first participant to a display associated with a computing resource with an indication that the first participant is to use the computing resource, wherein the computing resource is located in the second physical space.

2. The method of claim 1, further comprising:
   communicating with a reservation system to determine the availability of the physical resource for the first participant; and
   reserving the physical resource for the first participant upon determining that the physical resource is available.

3. The method of claim 1, further comprising:
   providing directions to the second physical space allocated to the first participant.

4. The method of claim 1, further comprising:
   capturing an image of the first participant from a video stream associated with the video conference; and
   displaying the image with an indication that the physical resource is allocated to the first participant associated with the image.

5. The method of claim 1, further comprising:
   pushing an update to a digital signage device, wherein the update causes the digital signage device to display a location of the physical resource for directing the first participant to the physical resource.

6. The method of claim 1, wherein the physical resource comprises a computing resource, the method comprising:
   connecting the computing resource to the virtual breakout room based on an authentication of the first participant using the computing resource.

7. The method of claim 1, wherein the physical resource comprises a computing resource, the method comprising:
   determining an identity of the first participant using facial recognition; and
   configuring the computing resource for use by the first participant based on the identity.

8. The method of claim 1, wherein detecting the multiple participants in the first physical space comprises:
   detecting the first participant and a second participant within a video stream transmitted from a shared computing resource associated with the first physical space, wherein the allocation of the physical resource to the first participant is based on the shared computing resource being used for both of the first participant and the second participant.

9. The method of claim 1, wherein the physical resource comprises a computing resource, the method comprising:

pushing a configuration associated with the first participant to the computing resource based on the allocation of the computing resource to the first participant.

10. The method of claim 1, wherein the virtual breakout room is a first virtual breakout room, and wherein the physical resource is a first physical resource, the method comprising:
assigning a second participant of the multiple participants to a second virtual breakout room associated with the video conference;
determining an availability of a second physical resource for the second participant to use in connection with the second virtual breakout room; and
allocating the second physical resource to the second participant for use in connection with the second virtual breakout room based on the availability.

11. The method of claim 1, further comprising:
using a machine learning model to determine that the first participant will participate in the video conference; and
allocating the physical resource to the first participant based on the determination.

12. The method of claim 1, further comprising:
detecting a remote participant of the video conference in a second physical space; and
assigning the remote participant to the virtual breakout room.

13. A system, comprising:
one or more memories; and
one or more processors configured to execute instructions stored in the one or more memories to:
detect multiple participants of a video conference in a first physical space;
assign a first participant of the multiple participants to a virtual breakout room associated with the video conference;
determine an availability of a physical resource for the first participant to use in connection with the virtual breakout room, the physical resource comprising a second physical space;
allocate the physical resource to the first participant for use in connection with the virtual breakout room based on the availability;
capture an image of the first participant from a video stream associated with the video conference; and
display the image of the first participant to a display associated with a computing resource with an indication that the first participant is to use the computing resource, wherein the computing resource is located in the second physical space.

14. The system of claim 13, wherein the one or more processors are further configured to execute instructions stored in the one or more memories to:
communicate with a reservation system to determine the availability of the physical resource for the first participant; and
reserve the physical resource for the first participant upon determining that the physical resource is available.

15. The system of claim 13, wherein the one or more processors are further configured to execute instructions stored in the one or more memories to:
provide directions to the second physical space allocated to the first participant.

16. The system of claim 13, wherein the one or more processors are further configured to execute instructions stored in the one or more memories to:
capture an image of the first participant from a video stream associated with the video conference; and
display the image with an indication that the physical resource is allocated to the first participant associated with the image.

17. One or more non-transitory computer readable media storing instructions operable to cause one or more processors to perform operations comprising:
detecting multiple participants of a video conference in a first physical space;
assigning a first participant of the multiple participants to a virtual breakout room associated with the video conference;
determining an availability of a physical resource for the first participant to use in connection with the virtual breakout room, the physical resource comprising a second physical space;
allocating the physical resource to the first participant for use in connection with the virtual breakout room based on the availability;
capturing an image of the first participant from a video stream associated with the video conference; and
displaying the image of the first participant to a display associated with a computing resource with an indication that the first participant is to use the computing resource, wherein the computing resource is located in the second physical space.

18. The one or more non-transitory computer readable media of claim 17, the operations further comprising:
communicating with a reservation system to determine the availability of the physical resource for the first participant; and
reserving the physical resource for the first participant upon determining that the physical resource is available.

19. The one or more non-transitory computer readable media of claim 17, the operations further comprising:
providing directions to the second physical space allocated to the first participant.

20. The method of claim 1, wherein a remote participant uses a remote client device to attend the video conference remotely, the remote being assigned to the virtual breakout room via the remote client device without physically moving to the second physical space.

\* \* \* \* \*